United States Patent
Choi

(10) Patent No.: US 11,354,774 B2
(45) Date of Patent: Jun. 7, 2022

(54) FACIAL MODEL MAPPING WITH A NEURAL NETWORK TRAINED ON VARYING LEVELS OF DETAIL OF FACIAL SCANS

(71) Applicant: Unity Technologies SF, San Francisco, CA (US)

(72) Inventor: Byung Kuk Choi, Wellington (NZ)

(73) Assignee: Unity Technologies SF, San Francisco, CA (US)

( * ) Notice: Subject to any disclaimer, the term of this patent is extended or adjusted under 35 U.S.C. 154(b) by 0 days.

(21) Appl. No.: 17/197,208

(22) Filed: Mar. 10, 2021

(65) Prior Publication Data

US 2022/0108422 A1    Apr. 7, 2022

Related U.S. Application Data

(60) Provisional application No. 63/088,263, filed on Oct. 6, 2020.

(51) Int. Cl.

| G06T 3/40 | (2006.01) |
|---|---|
| G06T 17/20 | (2006.01) |
| G06T 13/40 | (2011.01) |
| G06T 7/73 | (2017.01) |

(52) U.S. Cl.
CPC .............. *G06T 3/4046* (2013.01); *G06T 7/73* (2017.01); *G06T 13/40* (2013.01); *G06T 17/20* (2013.01); *G06T 2207/20081* (2013.01); *G06T 2207/20084* (2013.01); *G06T 2207/30201* (2013.01)

(58) Field of Classification Search
None
See application file for complete search history.

(56) References Cited

U.S. PATENT DOCUMENTS

| 8,902,232 B2 | 12/2014 | Debevec et al. | |
|---|---|---|---|
| 10,671,082 B2 * | 6/2020 | Huang | G06T 3/4046 |
| 2006/0067573 A1 * | 3/2006 | Parr | G06V 40/169 |
| | | | 382/154 |
| 2018/0130255 A1 * | 5/2018 | Hazeghi | H04N 13/239 |
| 2018/0197331 A1 * | 7/2018 | Chen | G06T 19/20 |
| 2019/0035149 A1 * | 1/2019 | Chen | G06T 17/20 |
| 2019/0362546 A1 * | 11/2019 | Wayenberg | G06T 7/90 |
| 2020/0234480 A1 * | 7/2020 | Volkov | G06T 7/73 |

OTHER PUBLICATIONS

Li et al., "Multimodal 2D+3D Facial Expression Recognition with Deep Fusion Convolutional Neural Network" (Year: 2017).*

(Continued)

*Primary Examiner* — Hilina K Demeter
(74) *Attorney, Agent, or Firm* — Philip H. Albert; Haynes and Boone LLP

(57) ABSTRACT

In an image processing system, a scan of an actor is converted to a high-resolution two-dimensional map, which is converted to low-resolution map and to a facial rig model. Manipulations of the facial rig create a modified facial rig. A new low-resolution two-dimensional map can be obtained of the modified facial rig and a neural network can be used to generate a new high-resolution two-dimensional map that can be used to generate a mesh that is a mesh of the scan, modified by the manipulations of the facial rig.

14 Claims, 16 Drawing Sheets

(56) References Cited

OTHER PUBLICATIONS

Bailey et al., "Fast and Deep Facial Deformations," (2020) ACM Trans Graph 39(4):Article 94.
Li et al., "Dynamic Facial Asset and Rig Generation from a Single Scan," (2020) ACM Trans Graph 39(6):Article 215.
Li et al., "Learning Formation of Physically-based Face Attributes," (2020) arxiv.org, Cornell University Library, 201 Olin Library Cornell University Ithaca, NY 14853.
Yang et al., "FaceScape: a Large-scale High Quality 3D Face Dataset and Detailed Riggable 3D Face Prediction," (2020) arxiv.org, Cornell University Library, 201 Olin Library Cornell University Ithaca, NY 14853.

* cited by examiner

Pose A – Large Scale

Pose B – Large Scale

Pose C – Large Scale

Pose A – Fine Scale

Pose B – Fine Scale

Pose C – Fine Scale

FACIAL MODEL MAPPING WITH A NEURAL NETWORK TRAINED ON VARYING LEVELS OF DETAIL OF FACIAL SCANS

CROSS-REFERENCES TO PRIORITY AND RELATED APPLICATIONS

This application claims the benefit of, and priority from, U.S. Provisional Patent Application No. 63/088,263 filed Oct. 6, 2020, entitled "Facial Model Mapping with a Neural Network Trained on Varying Levels of Detail of Facial Scans."

The entire disclosure of the application recited above is hereby incorporated by reference, as if set forth in full in this document, for all purposes.

FIELD

The present disclosure generally relates to computer graphics manipulation and more particularly to mapping scans from a high-resolution space to a low-resolution space for manipulation and mapping back to a high-resolution space.

BACKGROUND

Many industries generate or use computer-generated imagery, such as images or video sequences. The computer-generated imagery might include computer-animated characters that are based on live actors. For example, a feature film creator might want to generate a computer-animated character having facial expressions, movements, behaviors, etc. of a live actor, human or otherwise. It might be possible to have an animator specify, in detail, a surface of the live actor's body, but that can be difficult when dealing with facial expressions and movements of the live actor, as there are many variables.

In computer graphics and animation, there is often a need to scan an actor or object at a high resolution to maintain details. However, where there is also a need to manipulate a scan to obtain a modified result, operating on a high-resolution scan can be difficult, requiring more computational effort and requiring a high level of attention to detail on the part of an artist manipulating the scan, all while maintaining consistency with what might be expected from the modified result. For example, if the scan is of a human face, often it is desirable that the modified results be limited to what is physically possible from the human face.

One approach is to just convert the scan to a low-resolution scan and operate on the low-resolution scan, but that can result in loss of detail. Improved scan manipulation systems are desirable.

SUMMARY

A computer graphics processing system might process data derived from scans of live actors according to a method comprising, under the control of one or more computer systems configured with executable instructions, obtaining scan data corresponding to a part of an actor, such as a facial scan of an actor in a first pose, determining a set of feature values for positions or characteristics of features of the actor, generating a first two-dimensional mapping of the set of feature values from the facial scan to a high-resolution UV-space map, generating a second two-dimensional mapping from the first two-dimensional mapping at a lower resolution than the first two-dimensional mapping, generating, from the second two-dimensional mapping, a facial rig having a first facial rig state corresponding to the first pose for the actor, obtaining artist modifications, in a facial rig space, to the facial rig to form a second facial rig state, generating a third two-dimensional mapping representing the artist modifications to the facial rig, applying the third two-dimensional mapping to a neural network trained on differing resolution levels of UV-space maps, to form a fourth two-dimensional mapping having a higher resolution than the third two-dimensional mapping, and generating a mesh, defined in a three-dimensional space, corresponding to the facial scan of the actor modified according to the artist modifications made in the facial rig space.

The first facial rig state might represent a neutral pose and the second facial rig state represents a second pose distinct from the neutral pose. The method might further comprise obtaining scan data from a plurality of poses of the actor and generating a plurality of facial rig states from the plurality of poses. The set of feature values might comprise positions of a plurality of vertices of the scan data.

The neural network might be a convolutional neural network (CNN) and the method might comprise training the CNN by obtaining a plurality of scan datasets, each comprising a scan of a pose of the actor, generating a plurality of low-resolution images, wherein each of the plurality of low-resolution images comprises an image of a scan represented in the plurality of scan datasets, obtaining a UV texture map of a face of the actor, generating a plurality of vertex maps, wherein each of the plurality of vertex maps comprises represents a mapping from a low-resolution image of the plurality of vertex maps to the UV texture map, and applying, in a training process, pairs of CNN inputs, wherein a pair of CNN inputs comprises a vertex map from the plurality of vertex maps and a ground truth input comprising a corresponding scan of the plurality of scan datasets wherein the vertex map is derived from the corresponding scan, whereby the CNN is trained to output an estimate of a scan based on an input vertex map. In other variations, a UV map that is not specifically a texture map might be used.

The input vertex map might correspond to vertices in the UV-space that map to vertices in the corresponding scan. The vector might represent a movement of a point on the facial scan in the two-dimensional space. The two-dimensional mappings arrays might be stored as UV maps in image files.

The method might further comprise generating a facial model from the facial scan, to be used in generating the facial expression procedurally and independent of scans of the actor.

The methods might be embodied in a non-transitory computer-readable storage medium storing instructions, which when executed by at least one processor of a computer system, causes the computer system to carry out one or more steps of the methods described herein.

A computer system might be provided that comprises one or more processors and a storage medium storing instructions, which when executed by the at least one processor, cause the system to implement one or more steps of the methods described herein.

A carrier medium might carry image data that includes pixel information generated according to one or more steps of the methods described herein.

This Summary is provided to introduce a selection of concepts in a simplified form that are further described below in the Detailed Description. This Summary is not intended to identify key features or essential features of the claimed subject matter, nor is it intended to limit the scope of the claimed subject matter. A more extensive presentation of features, details, utilities, and advantages of the surface computation method, as defined in the claims, is provided in the following written description of various embodiments of the disclosure and illustrated in the accompanying drawings.

BRIEF DESCRIPTION OF THE DRAWINGS

Various embodiments in accordance with the present disclosure will be described with reference to the drawings, in which.

DETAILED DESCRIPTION

Figure 1:
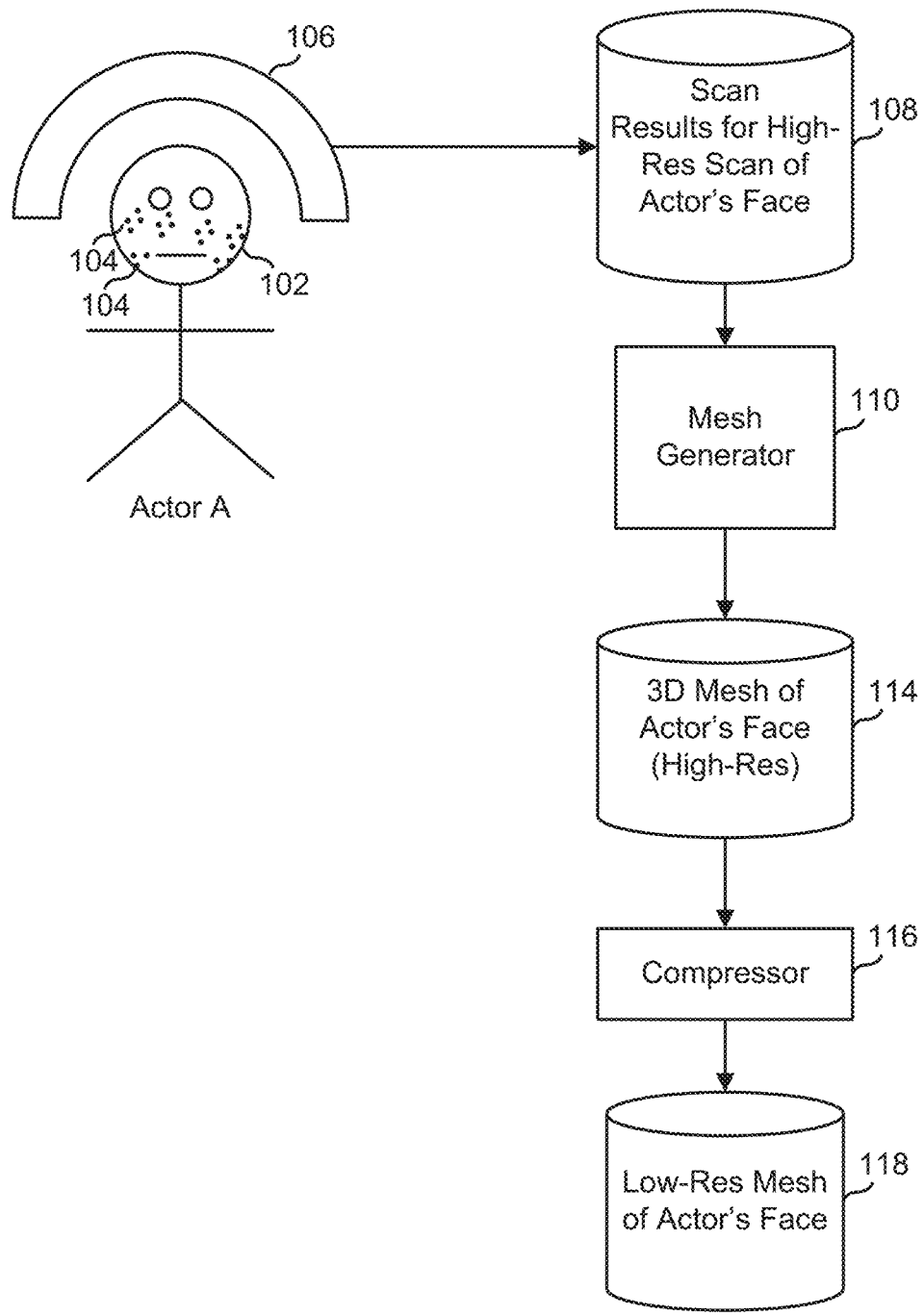
FIG. 1 is a diagram of a method and apparatus for generating a low-resolution ("low-res") mesh of an actor's face from a three-dimensional ("3D") scan of the actor.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

An animator might be a human artist, filmmaker, photography image creator, or the like, who seeks to generate one or more images (such as a video sequence forming an animation) based on animator input and other data available to the animator. In some embodiments, the animator might be an automated or partially automated process. Animator inputs might include specifications of values for positions of movable elements. For example, an articulated character's movement might be specified by values of each available joint in the character. A rig might be a representation of data that corresponds to elements of a character, the allowed movements, etc.

One such rig is a facial rig. An animator might be provided with a user interface of an animation creation system that allows the animator to input values for various movable elements of the facial rig. Some movable elements might be a jaw and a collection of muscles. From a specification of provided variables of the movable elements of the facial rig, the animation creation system can generate a pose of the facial rig. However, often a desired output is a mesh that characterizes or represents a high-resolution surface in three-dimensional space of the actor's face (or the face of a fanciful or created character played by the actor) that reflects modifications the artist made while allowing the artist to make those modifications in a simplified space, such as a low-resolution UV map space or a facial rig space.

In other variations, instead of facial scans, scans of other body parts or other objects are performed. Additionally, instead of scan data, more generally pose data that might be generated from models or programmatically could be used instead of specifically scan data.

In an example implementation, a high-resolution three-dimensional scan of an actor's face is taken and digitized to form a scan dataset. A computer process then generates a 3D mesh corresponding to that scan and compress that to a low-res mesh. Differences between a bind pose, wherein the actor is in a baseline pose when the actor's face is scanned, and an expression pose where the actor is expressing some expression and a high-res 3D scan is obtained, can be stored as a collection of vectors with each vector representing a displacement of a vertex of a mesh representing the actor. The vectors can be stored as pixels in an image file and those image files can be processed by a CNN as if they were images. With a CNN trained to infer details of a high-res UV map of the actor's face in an expression pose from a low-res UV map, an animation system can use low-res UV maps for editing a pose. By editing the low-res UV map instead of the high-res UV map or the 3D mesh, an editing system can process edits with much less computational effort. As explained herein, methods for generating a low-res UV map from high-res 3D scan details is shown, as well as modules that can infer details of a high-res UV map from a low-res UV map. By operating in UV space, certain optimizations of image-based CNN training could be used. By operating an editor in low-res UV space, less computation might be needed relative to editing high-res details. In some variations, two-dimensional maps other that UV maps might be used.

FIG. 1 is a diagram of a method and apparatus for generating a low-resolution ("low-res") mesh of an actor's face from a 3D scan of the actor. As illustrated there, "Actor A" has their face 102 (with optional fiducials or marking dots 104 thereon) position so that a scanner 106 can take a 3D scan of face 102. Typically, this is done with live actors and might be used to animate a fanciful CGI character, but might be done with footage of no longer living actors and/or for other purposes. The marking dots 104 might be used to define vertices or used for matching points from scans, or other purposes. Scanner 106 would store results of a scan, or a plurality of scans, into a storage 108. Storage 108 might be disk or RAM, or some other form of computer-readable media or interface. It some cases, dozens, hundreds, thousands or more scans are obtained and stored. These might be taken in quick succession as the actor makes expressions, speak dialog, acts out a scene, runs through pre-determined stock exercises, or performs other facial movements. A mesh generator 110 can read in a scan from storage 108 and output a 3D mesh to a second storage 114, which might be a logical portion of a storage element that also comprises storage 108 or other storage.

A compressor 116 can read in the 3D mesh from second storage 114 and output a corresponding low-res mesh, which might be stored in a third storage 118, which might be a logical portion of a storage element that also comprises storage 108, storage 114, and/or other storage. The process can be repeated for more than one 3D scan, thus providing a set of low-res mesh data structures, each corresponding to a 3D scan.

Figure 2:
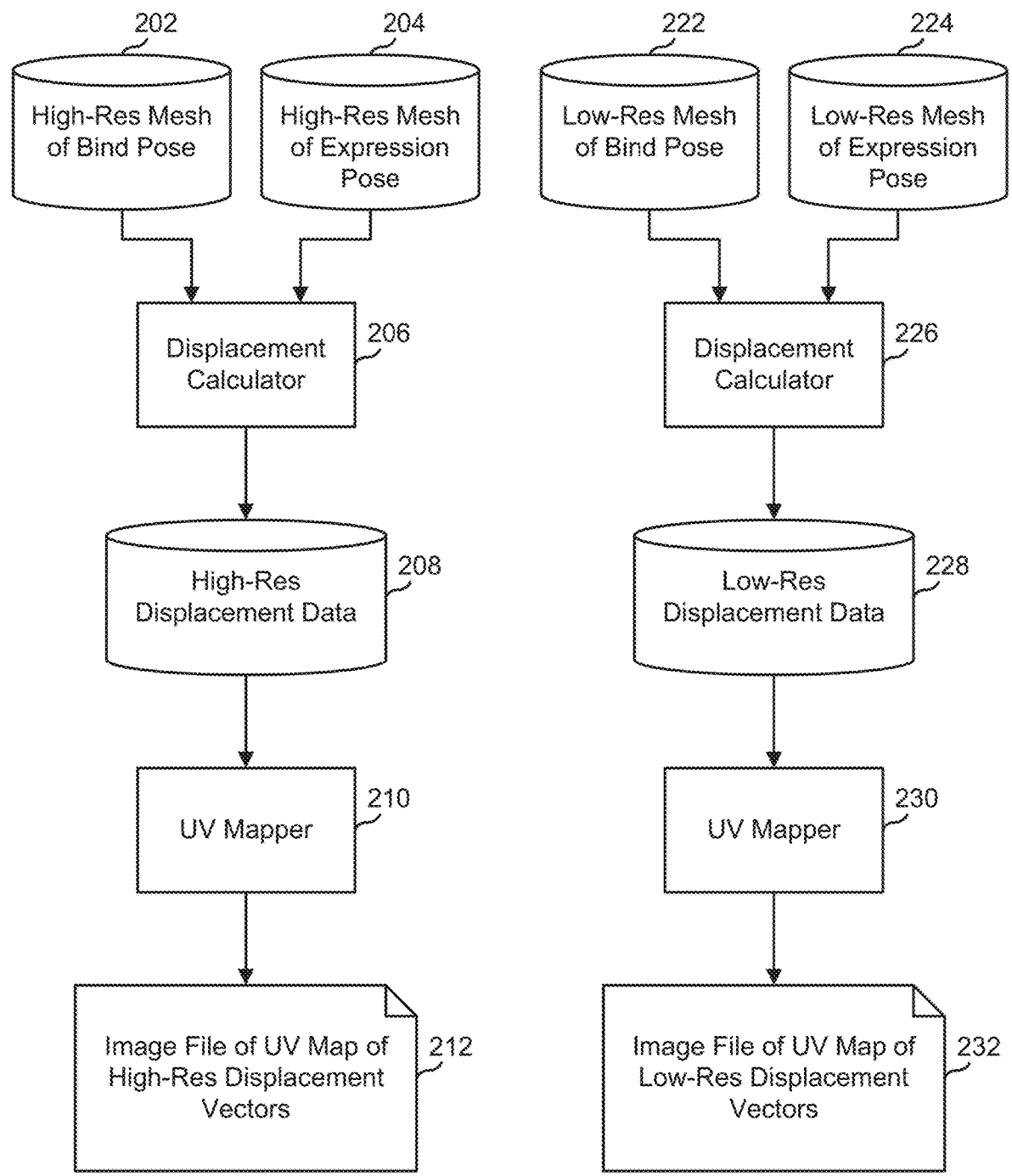
FIG. 2 is a diagram of a method and apparatus for generating image files corresponding to vertex displacements between bind poses and expression poses, for high-resolution ("high-res") meshes and low-res meshes.

FIG. 2 is a diagram of a method and apparatus for generating image files corresponding to vertex displacements between bind poses and expression poses, for high-resolution ("high-res") meshes and low-res meshes. High-res meshes might be generated as illustrated in FIG. 1 and the low-res meshes might be generated from high-res meshes as illustrated in FIG. 1. Meshes might be created for at least one mesh from a bind pose. In the example shown in FIG. 2, only one expression pose is explicitly provided for, but it should be understood that the apparatus shown in FIG. 2 process many expression poses.

As shown in the example of FIG. 2, a high-res mesh 202 of a bind pose and a high-res mesh of an expression pose are compared by a displacement calculator 206 that can determine displacements of corresponding vertices among those two meshes, which can be stored as high-res displacement data 208. Displacement calculator 206 can compute displacements of each vertex that is a vertex present in both meshes. A UV mapper 210 can read in high-res displacement data 208 and output an image file 212 that is a UV map of the high-res displacement data. In a specific embodiment, each of some pixels of image file 212 correspond to displacement vectors that represent displacement of vertices as between the two input poses. A displacement vector might be represented as a 3D vector value, which can be stored as if it were three color components of a pixel. For example, where pixel color values are stored as an R value, a G value, and a B value, those values might be used to store X-axis displacement of a vertex, Y-axis displacement of a vertex, and Z-axis displacement of a vertex, respectively.

Likewise, a similar process can be performed for a low-res mesh 222 of a bind pose and a low-res mesh 224 of an expression pose. As shown in the example of FIG. 2, low-res mesh 222 of the bind pose and low-res mesh 224 of the expression pose are compared by a displacement calculator 226 (which can be the same or similar to displacement calculator 206) that can determine displacements of corresponding vertices among those two meshes, which can be stored as low-res displacement data 228. A UV mapper 230 (which can be the same or similar to UV mapper 210) can read in low-res displacement data 228 and output an image file 232 that is a UV map of the low-res displacement data.

In a specific embodiment, each of some pixels of image file 232 correspond to displacement vectors that represent displacement of vertices as between the two low-res input poses.

Figure 3:
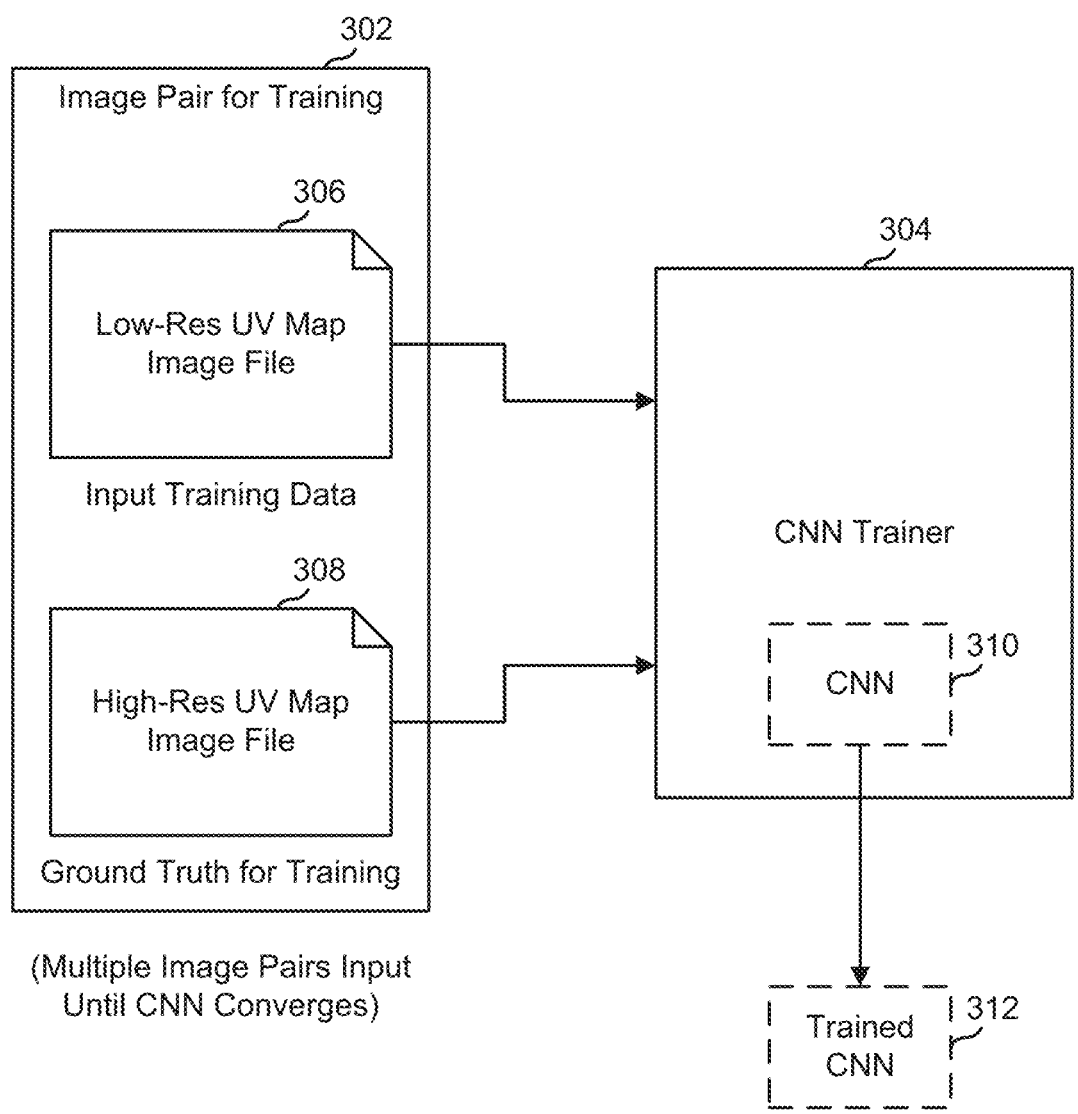
FIG. 3 illustrates training a convolutional neural network ("CNN") to be able to infer details of an image file representing a high-res UV map of a 3D scan from an image file representing a low-res UV map of the 3D scan.

FIG. 3 illustrates training a convolutional neural network ("CNN") 310 to be able to infer details of an image file representing a high-res UV map of a 3D scan from an image file representing a low-res UV map of the 3D scan. A CNN trainer 304 receives or obtains a plurality of training image pairs 302, wherein a training image pair might comprise a low-res UV map 306 in the form of an image map generated as described above as the CNN input training data, and might comprise a high-res UV map 308 in the form of an image map generated as described above as the CNN ground truth the CNN is to draw inferences from, given that low-res UV map 306 is derived from high-res UV map 308. Upon suitable training using image pairs, a trained CNN 312 results.

Figure 4:
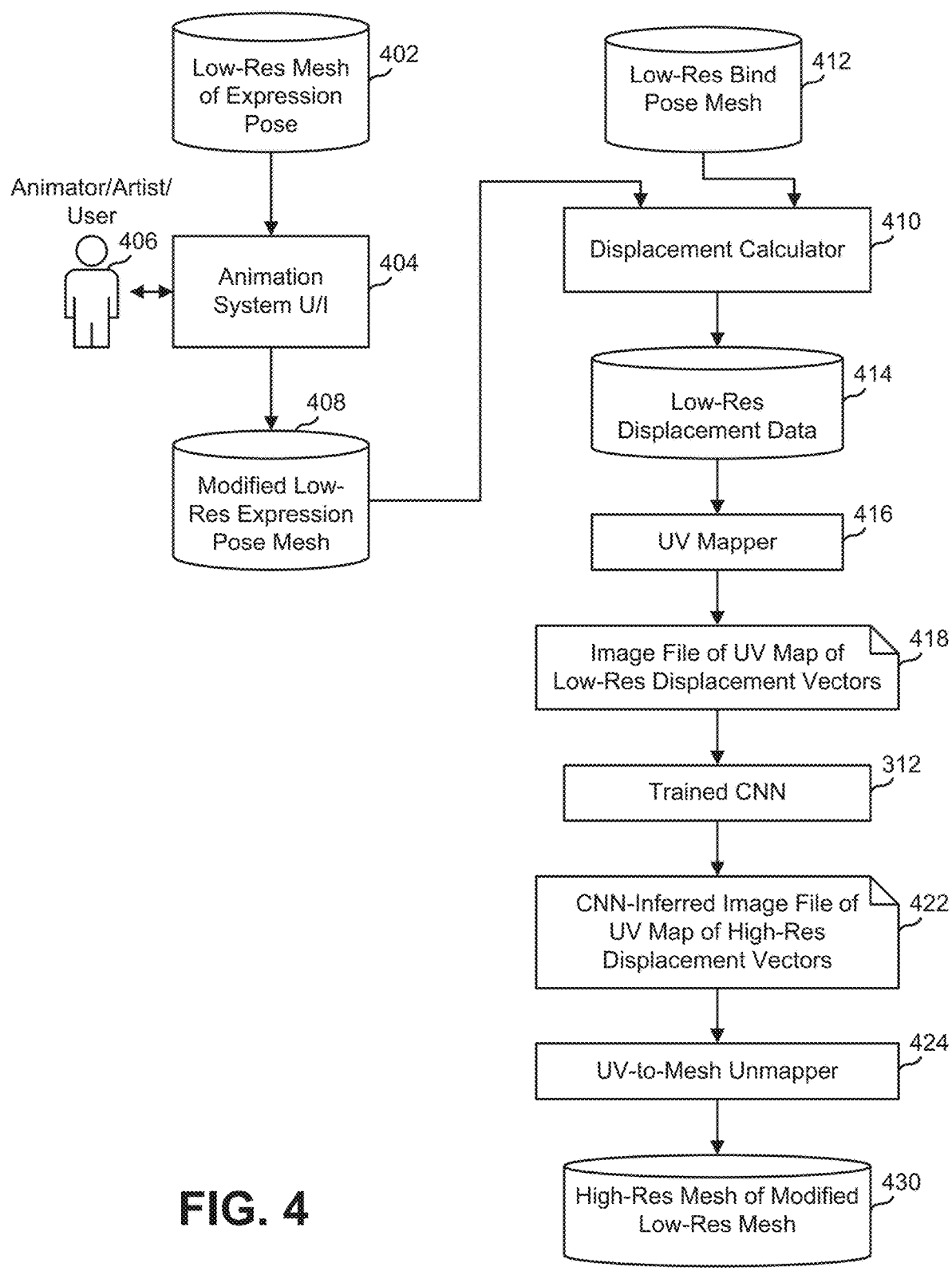
FIG. 4 is a diagram of a method and apparatus for generating a high-res mesh of a low-res mesh that has been modified in its low-res representation.

FIG. 4 is a diagram of a method and apparatus for generating a high-res mesh of a low-res mesh that has been modified in its low-res representation using trained CNN 312 trained as illustrated in FIG. 3. As illustrated there, an animation system 404 with a user interface can read in a low-res mesh 402 of an expression pose, display all or part of it to an animator/artist/user 406, who can then provide edits, which animation system 404 could then output as a modified low-res expression pose mesh 408.

A displacement calculator 410 might receive a low-res bin pose mesh 412 and modified low-res expression pose mesh 408, and output low-res displacement data 414. A UV mapper 416, which might operate as other UV mappers described herein, might process low-res displacement data 414 to form an image file 418 that is a UV map of low-res displacement vectors. Image file 418 can then be input to trained CNN 312, which can infer CNN-inferred details for a high-res mesh, in the form of a CNN-inferred image file 422 of a UV map of high-res displacement vectors.

A UV-to-mesh mapper 424 could then generate, from CNN-inferred image file 422, a high-res mesh 430 of the modified low-res expression pose mesh 408. In this manner, high-res meshes could be obtained as overall inputs and overall outputs, but editing can be done using low-res meshes.

Figure 5:
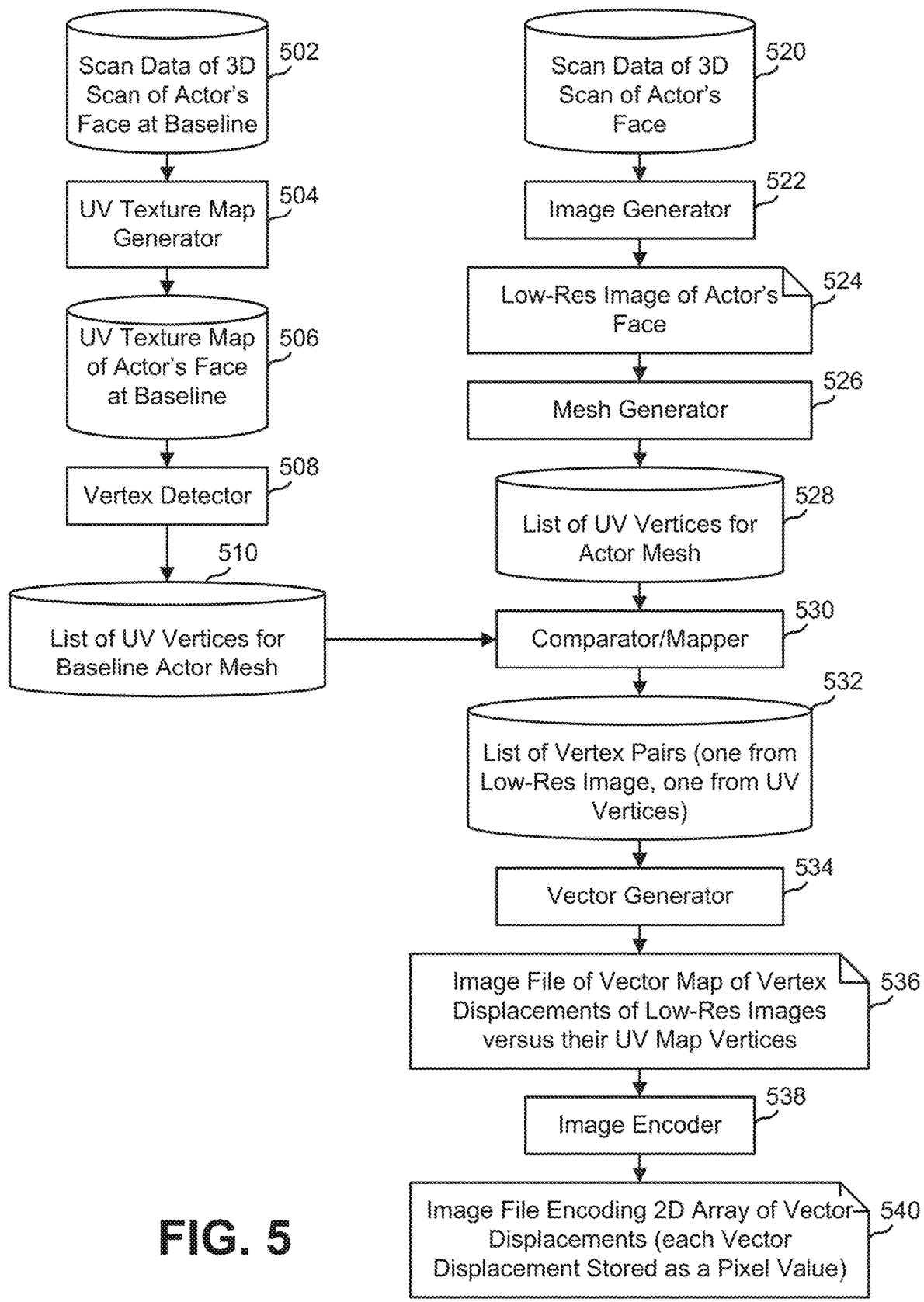
FIG. 5 is a diagram of another method and apparatus for encoding scans as UV maps of displacements of vertices in the scan relative to a baseline scan.

FIG. 5 is a diagram of another method and apparatus for encoding scans as UV maps of displacements of vertices in the scan relative to a baseline scan. As illustrated there, scan data 502 of a 3D scan of an actor's face at a baseline can be provided to a UV texture map generator 504, which can output a UV texture map 506 of the actor's face at the baseline. A vertex detector 508 can read UV texture map 506 and output a list 510 of UV vertices for the baseline actor mesh. Scan data 520 of a 3D scan of an actor's face in some expression can be provided to an image generator 522 that can generate a low-res image 524 of the actor's face. Low-res image 524 can be provided to a mesh generator 526, which can generate a list 528 of UV vertices for the scanned actor's face. A comparator/mapper 530 can consider list 510 and list 528 and generate a list of vertex pairs 532, wherein a vertex pair comprises a first vertex from one of list 510 and list 528 and a second vertex from the other of list 510 and list 528.

A vertex generator 534 can process list of vertex pairs 532 to form an image file 536 of vector map vertex displacements as between low-res image 524 and mesh vertices of UV texture map 506. An image encoder 538 can generate, from image file 336, an image file 540 encoding a 2D array of vector displacements stored as pixel values.

Figure 6:
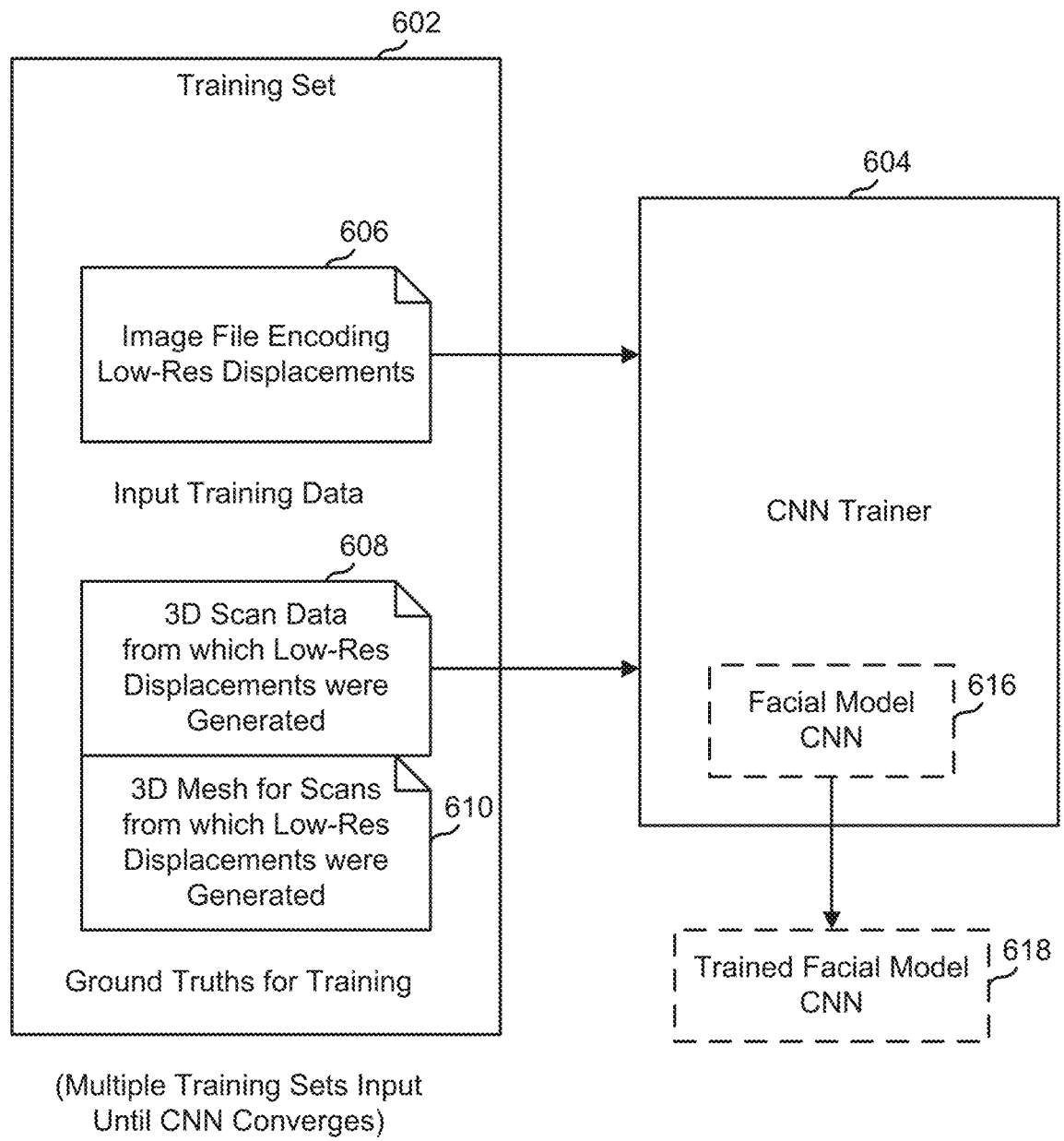
FIG. 6 illustrates training a facial model CNN to be able to infer details of a facial model from an image file representing a low-res UV map of a 3D scan of the face being modeled.

FIG. 6 illustrates training a facial model CNN to be able to infer details of a facial model from an image file representing a low-res UV map of a 3D scan of the face being modeled. As shown there, a CNN trainer 604 trains a facial model CNN 616 to form a trained facial model CNN 618 based on training sets. A training set 602 might comprise an image file 606 encoding low-re displacement vectors as input training data and 3D scan data 608 and 3D mesh data 610 as ground truths for training. 3D scan data 608 might be the 3D scan data used to generate the low-re displacement vectors of image file 606. 3D mesh data 610 might be the 3D mesh data used to generate the low-re displacement vectors of image file 606. The facial model might be a facial rig with artist-manipulable controls.

Figure 7:
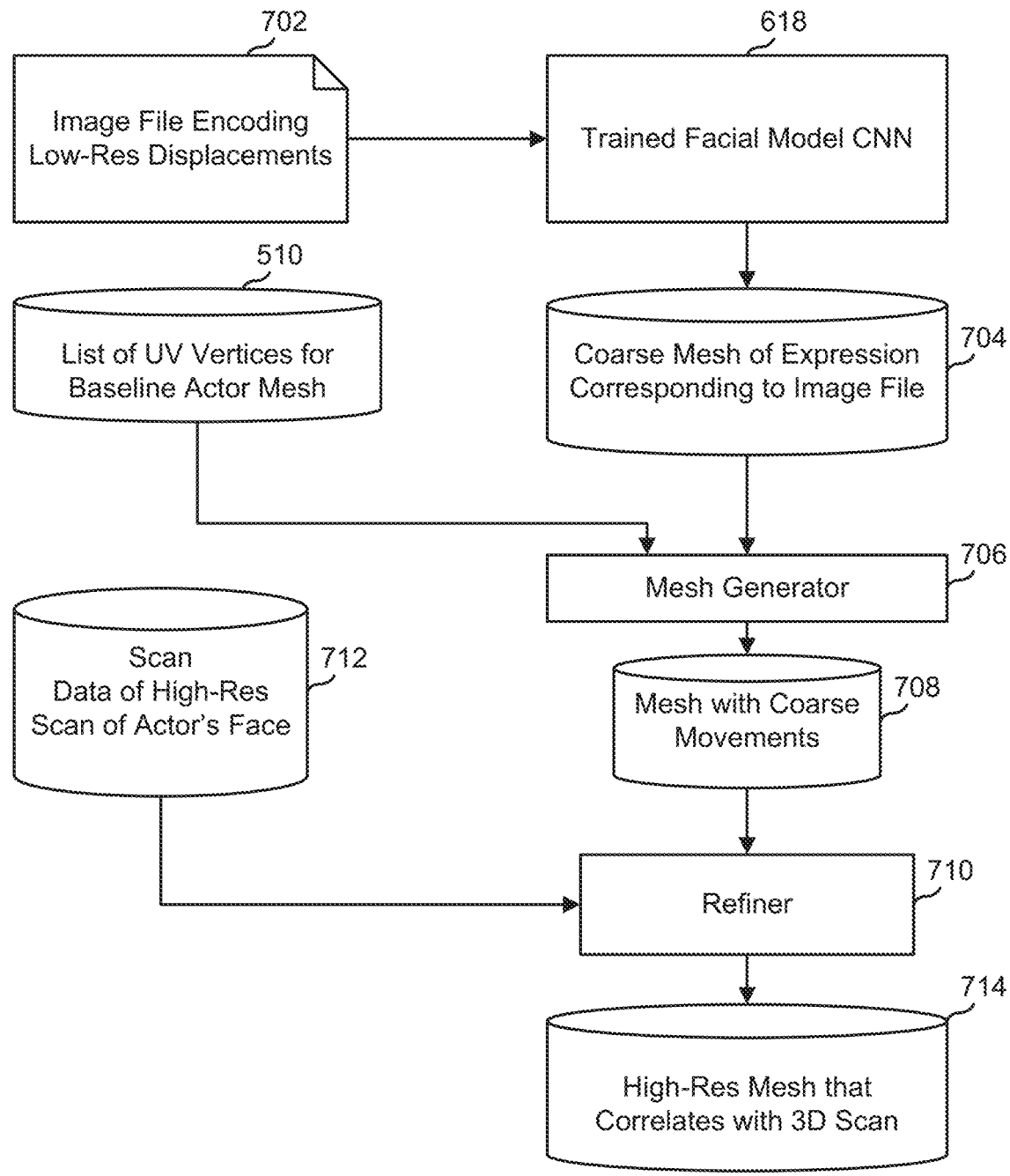
FIG. 7 is a diagram of a method and apparatus for using the trained facial model of FIG. 6 to generate high-res meshes from low-res displacement vector data.

FIG. 7 is a diagram of a method and apparatus for using the trained facial model of FIG. 6 to generate high-res meshes from low-res displacement vector data. As shown there, an image file 702 encoding low-res displacements might be provided to trained facial model CNN 681 that can then output a coarse mesh 704 of expression corresponding to image file 702. A mesh generator 706 can generate a mesh 708 with coarse movements between coarse mesh 704 and list 510 of UV vertices of the baseline actor mesh. A refiner 710 can process mesh 708 and scan data 712 of a high-res scan of the actor's face, to output a high-res mesh that correlates with the 3D scan.

Figure 8:
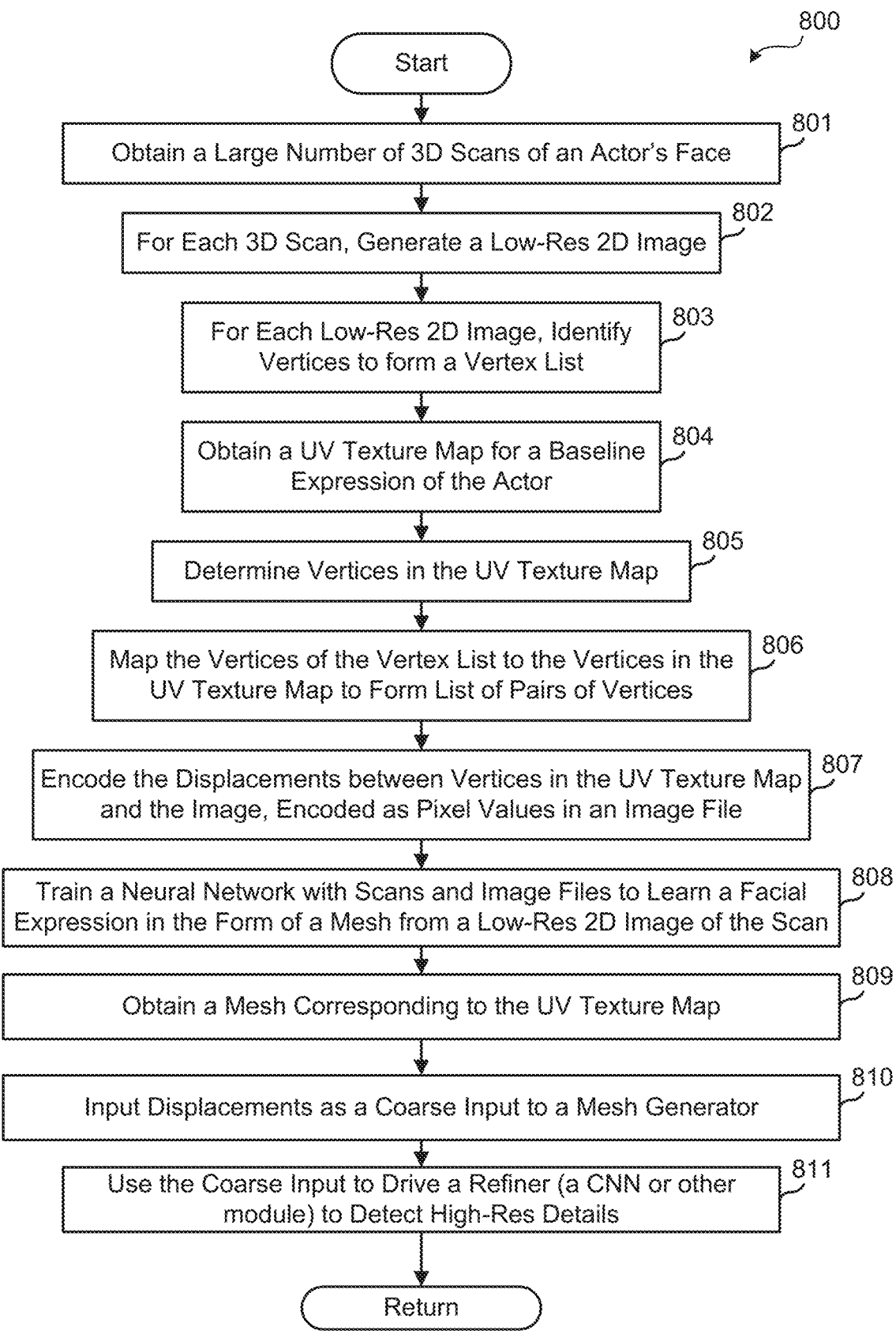
FIG. 8 is a flowchart of a process for training a system to learn facial expressions and use learned facial expressions to generate high-res meshes from coarse inputs.

FIG. 8 is a flowchart of a process 800 for training a system to learn facial expressions and use learned facial expressions to generate high-res meshes from coarse inputs. Process 800 might be executed by an animation processing computer system. In an initial step 801, the system obtains a large number of 3D scans of an actor's face and at step 802 generates, for each 3D scan, a low-res 2D image. At step 803, for each low-res 2D image, the system identifies vertices to form a vertex list. At step 804, the system obtains a UV texture map for a baseline expression of the actor, which might be read out from memory. At step 805, the system determines vertices in the UV texture map and at step 806, maps the vertices of the vertex list to the vertices in the UV texture map to form list of pairs of vertices. At step 807, the system encodes the displacements between vertices in the UV texture map and the image, encoded as pixel values in an image file. At step 808, a CNN trainer trains a CNN with scans and image files to learn a facial expression in the form of a mesh from a low-res 2D image of the scan. In some variations, two-dimensional maps other than UV texture maps, or even UV maps, might be used.

At step 809, the system obtains a mesh corresponding to the UV texture map and at step 810 inputs displacements as a coarse input to a mesh generator. At step 811, the system might use a coarse input to drive a refiner (a CNN or other module might be used) to detect high-res details.

Examples of Data Structures Represented as Images

Figure 9:
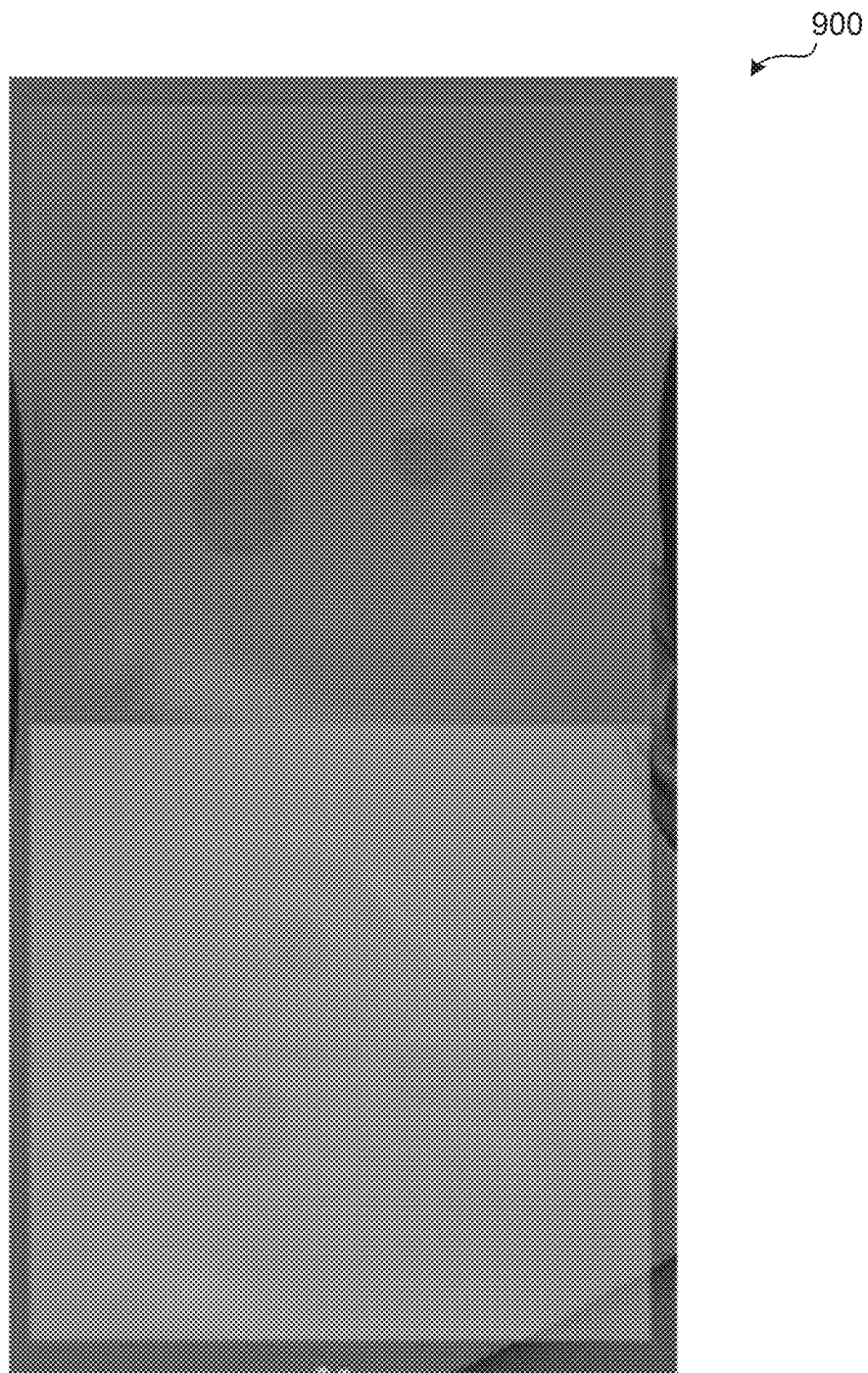
FIG. 9 shows an image that corresponds to a target displacement map that can be used to normalize a large-scale deformation to a fine-scale target.

FIG. 9 shows an image 900 that corresponds to a target displacement map that can be used to normalize a large-scale deformation to a fine-scale target.

Figure 10:
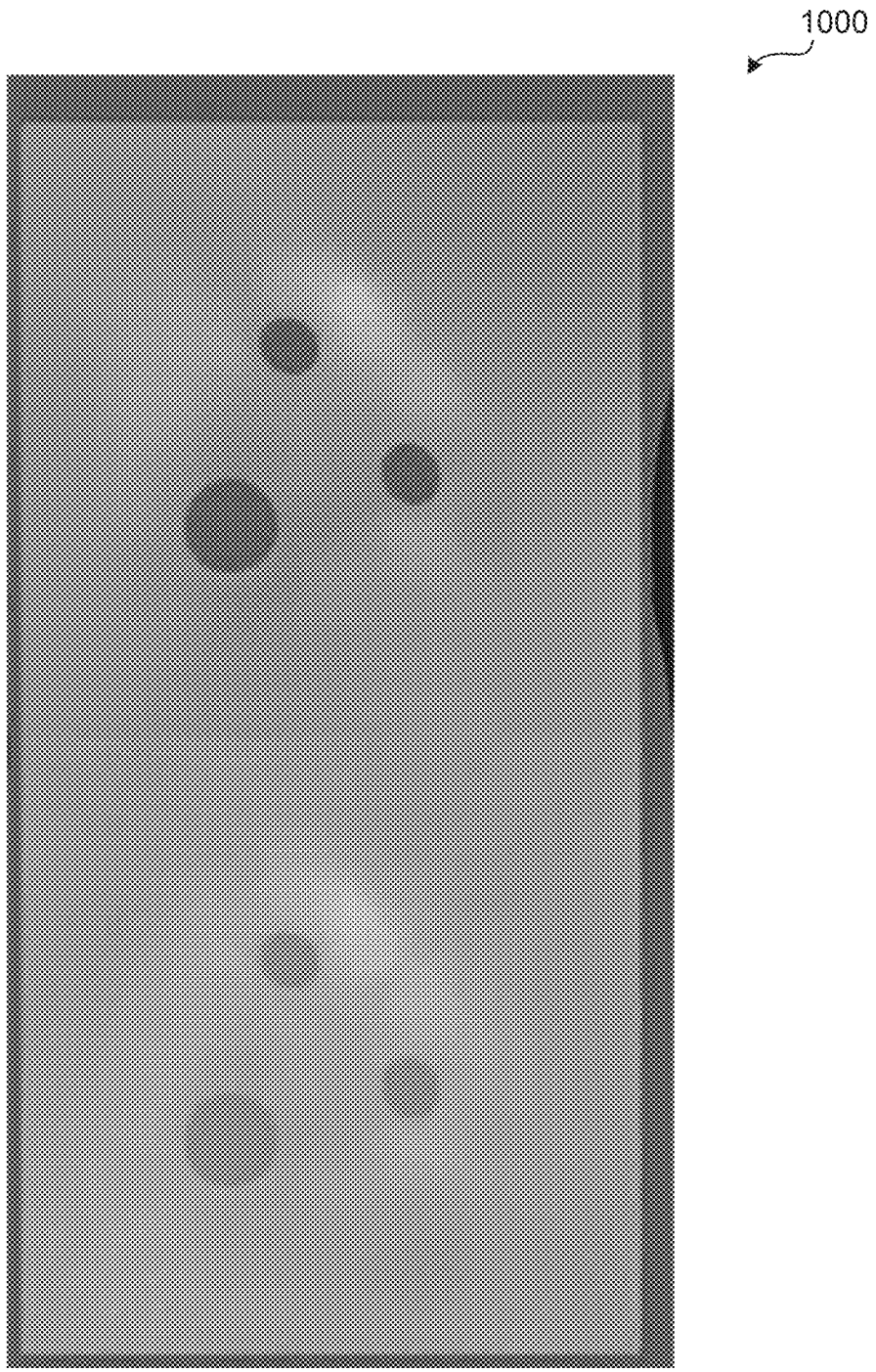
FIG. 10 shows an image that corresponds to an input displacement map that can be used to normalize the large-scale deformation to a bind-pose.

FIG. 10 shows an image 1000 that corresponds to an input displacement map that can be used to normalize the large-scale deformation to a bind-pose.

Figure 11:
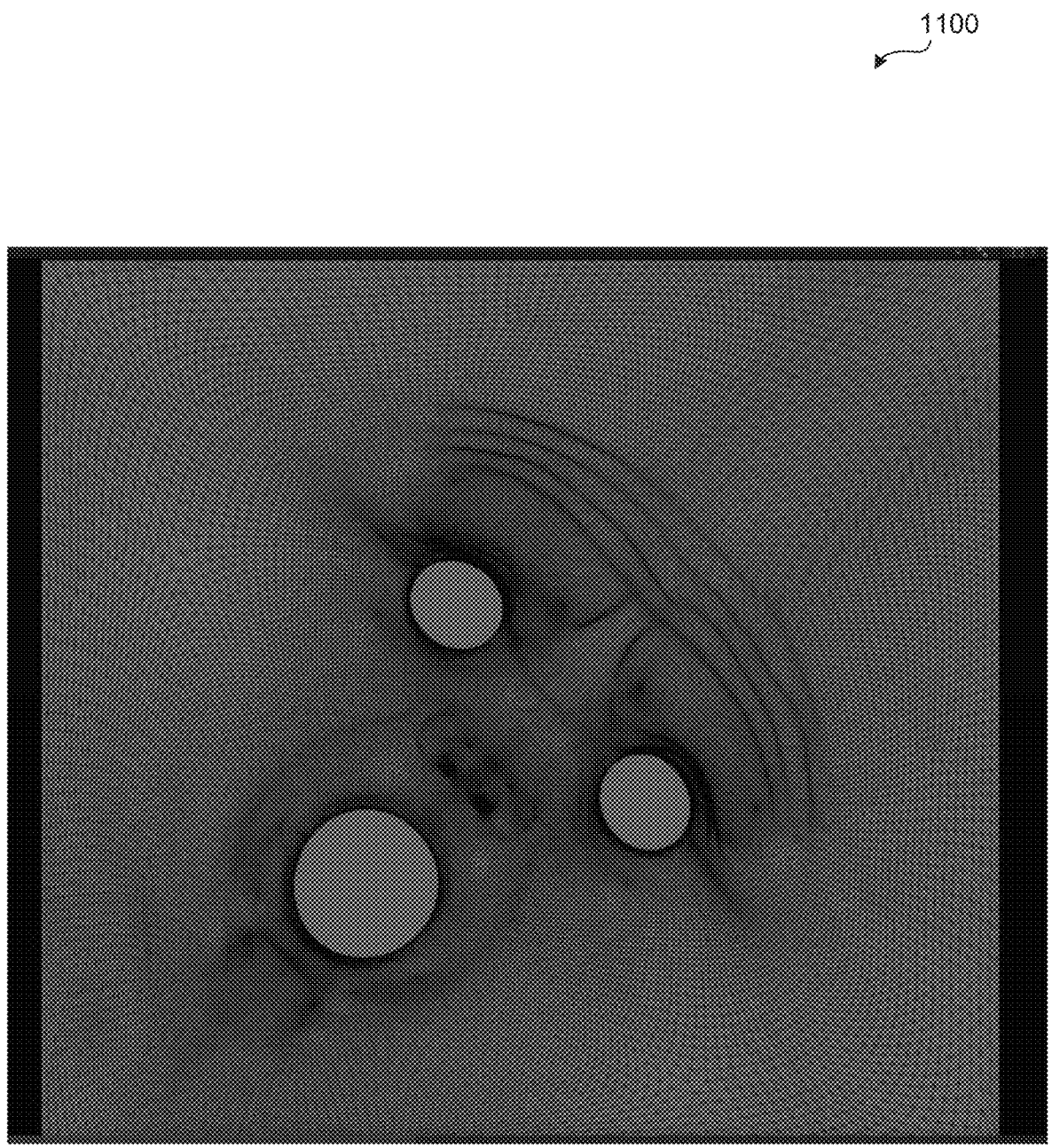
FIG. 11 shows an image that corresponds to a mesh.

FIG. 11 shows an image 1100 that corresponds to a mesh.

Figure 12:
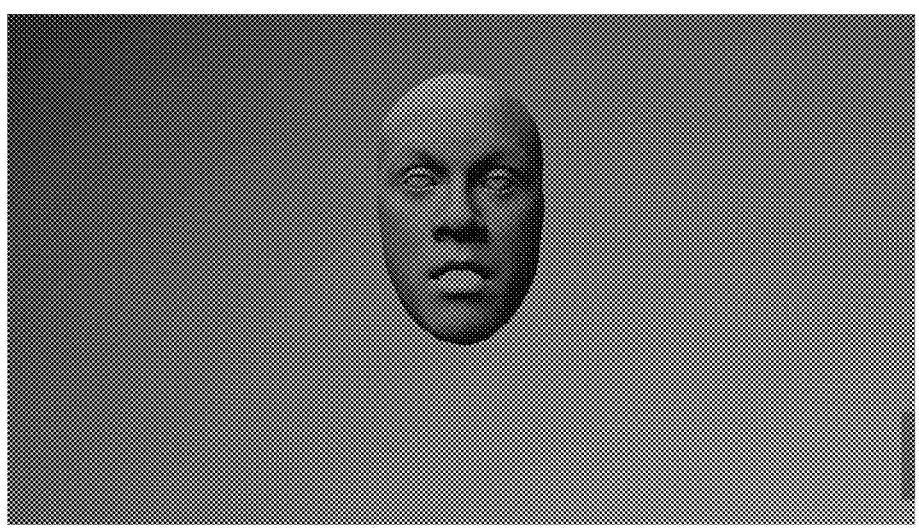
FIG. 12 shows images that illustrate displacement of a mesh of a large-scale deformation to a final deformation.
Figure 12:
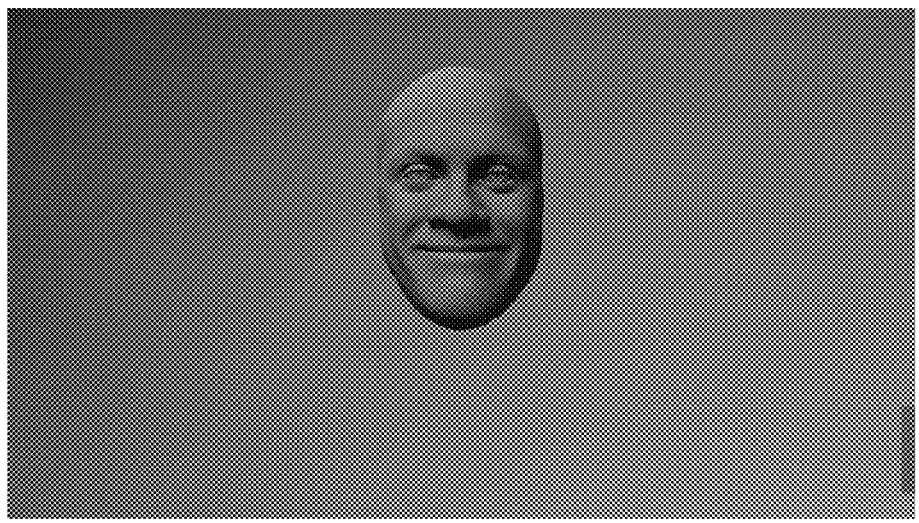
Figure 12:
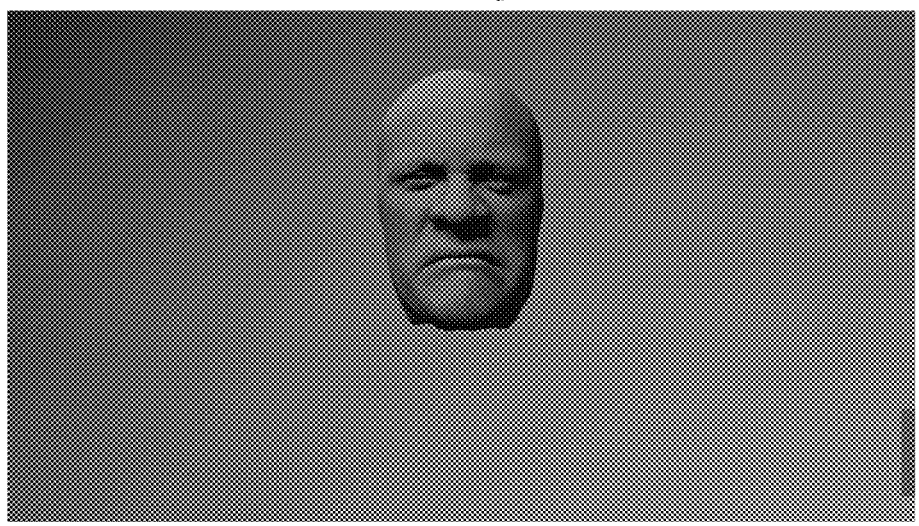

FIG. 12 shows images 1200 that illustrate displacement of a mesh of a large-scale deformation to a final deformation.

Figure 13:
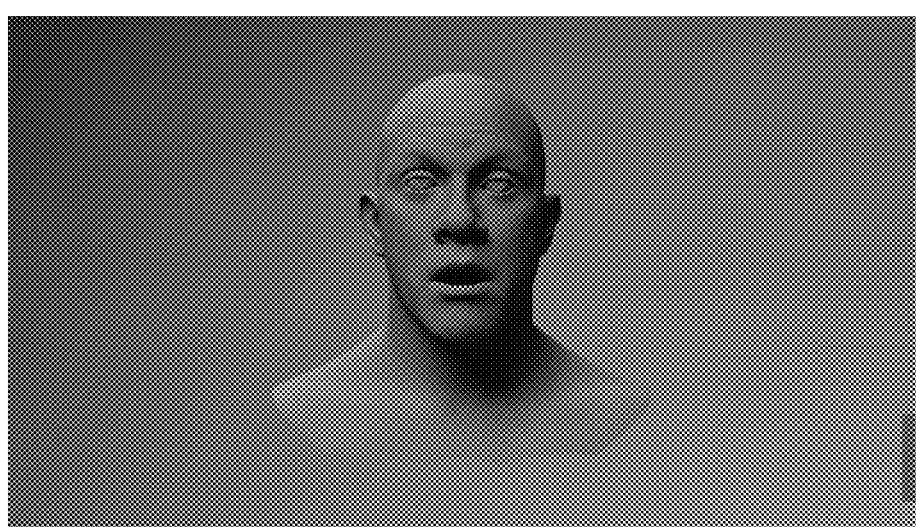
FIG. 13 shows images that illustrate application of displacements to a fine-scale target.
Figure 13:
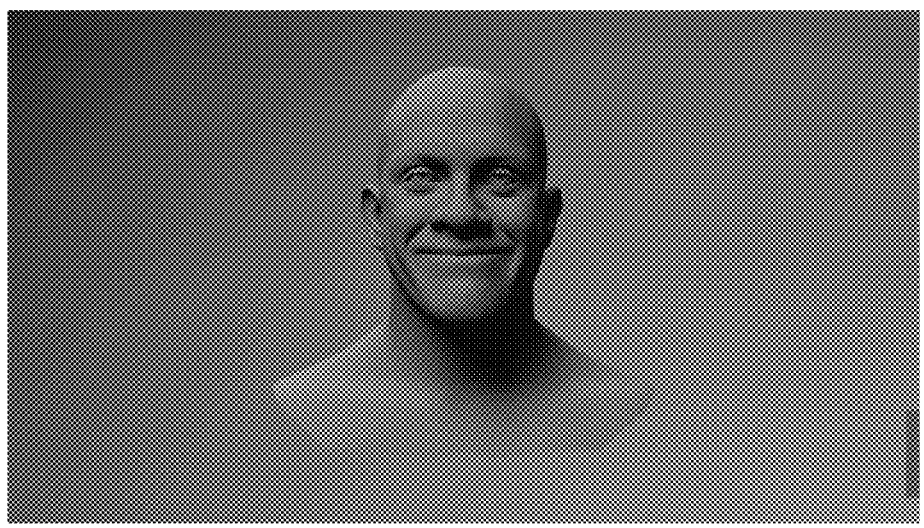
Figure 13:
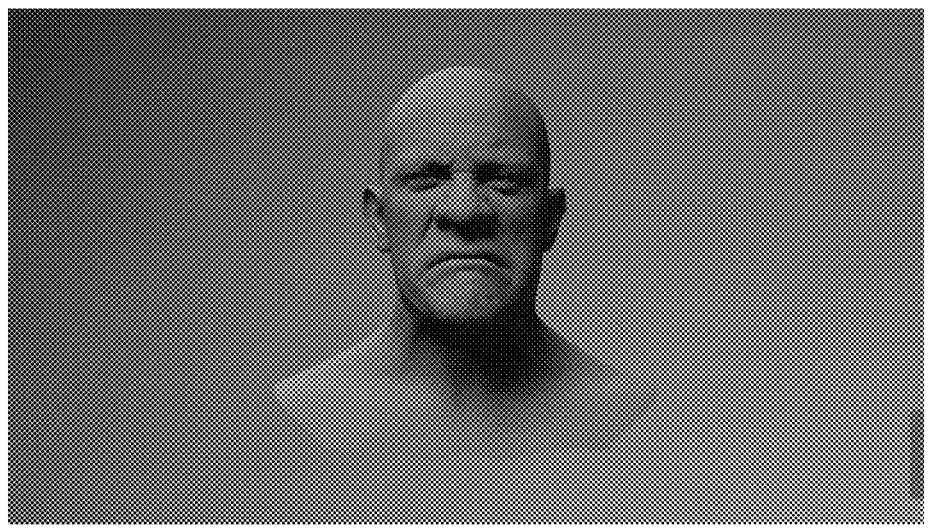

FIG. 13 shows images 1300 that illustrate application of displacements to a fine-scale target.

Figure 14:
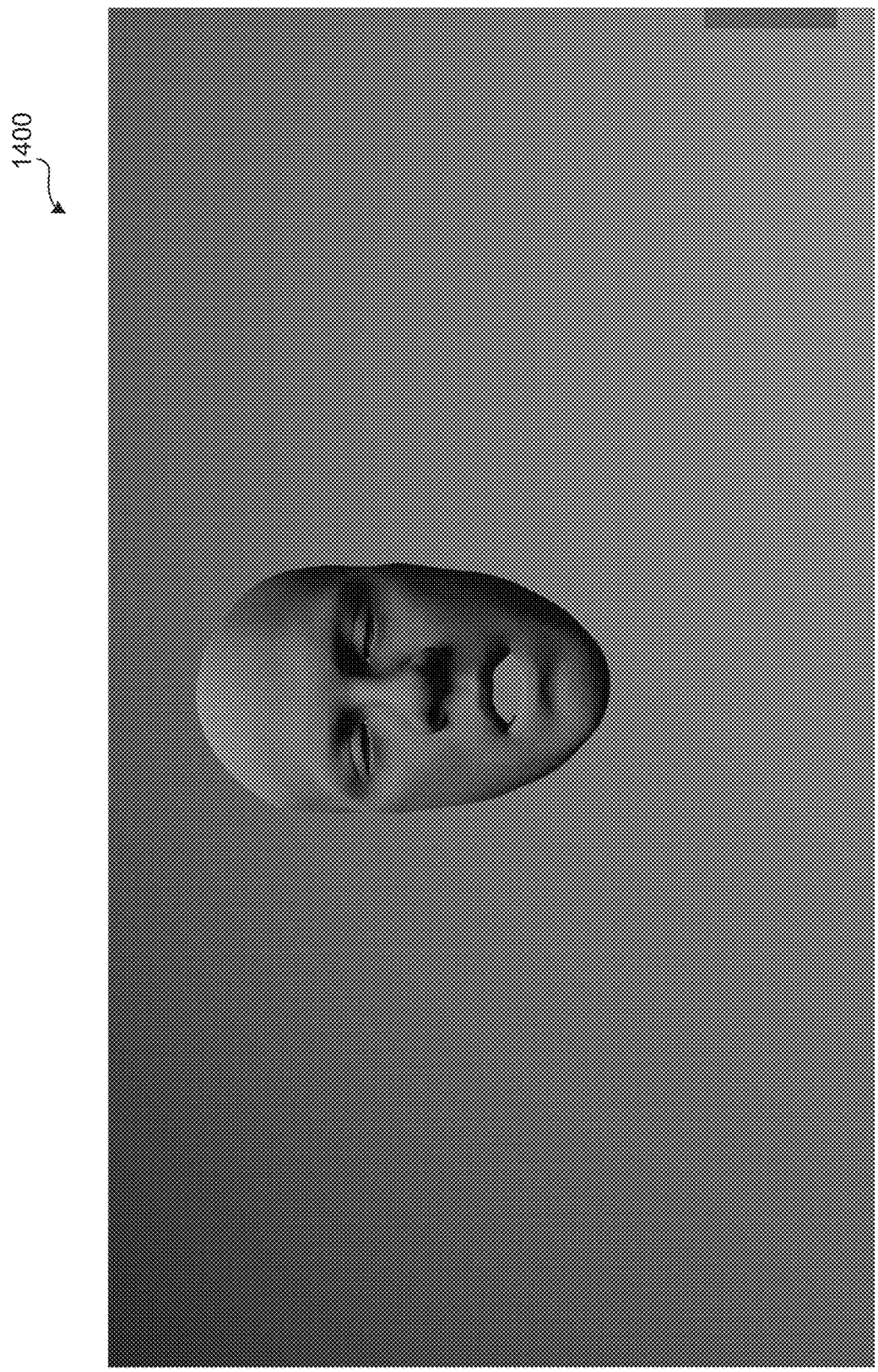
FIG. 14 shows an image that illustrates a bind pose combining displacements.

FIG. 14 shows an image 1400 that illustrates a bind pose combining displacements.

Visual Content Generation System

The process of FIG. 8 and elements of other figures might be used as part of a visual content generation system 1500 (see FIG. 15) to operate on scan data and provide user interfaces for manipulation of facial scans and other scans, in the UV space and the 3D space. For example, a system or module might obtain scan data corresponding to a facial scan of an actor in a first pose, determine a set of feature values for positions or characteristics of features of the actor, generate a first two-dimensional mapping of the set of feature values from the facial scan to a high-resolution UV-space map, generate a second two-dimensional mapping from the first two-dimensional mapping at a lower resolution than the first two-dimensional mapping, generate, from the second two-dimensional mapping, a facial rig having a first facial rig state corresponding to the first pose for the actor, obtain artist modifications, in a facial rig space, to the facial rig to form a second facial rig state, generate a third two-dimensional mapping representing the artist modifications to the facial rig, apply the third two-dimensional mapping to a neural network trained on differing resolution levels of UV-space maps, to form a fourth two-dimensional mapping having a higher resolution than the third two-dimensional mapping, and generate a mesh, defined in a three-dimensional space, corresponding to the facial scan of the actor modified according to the artist modifications made in the facial rig space.

Figure 15:
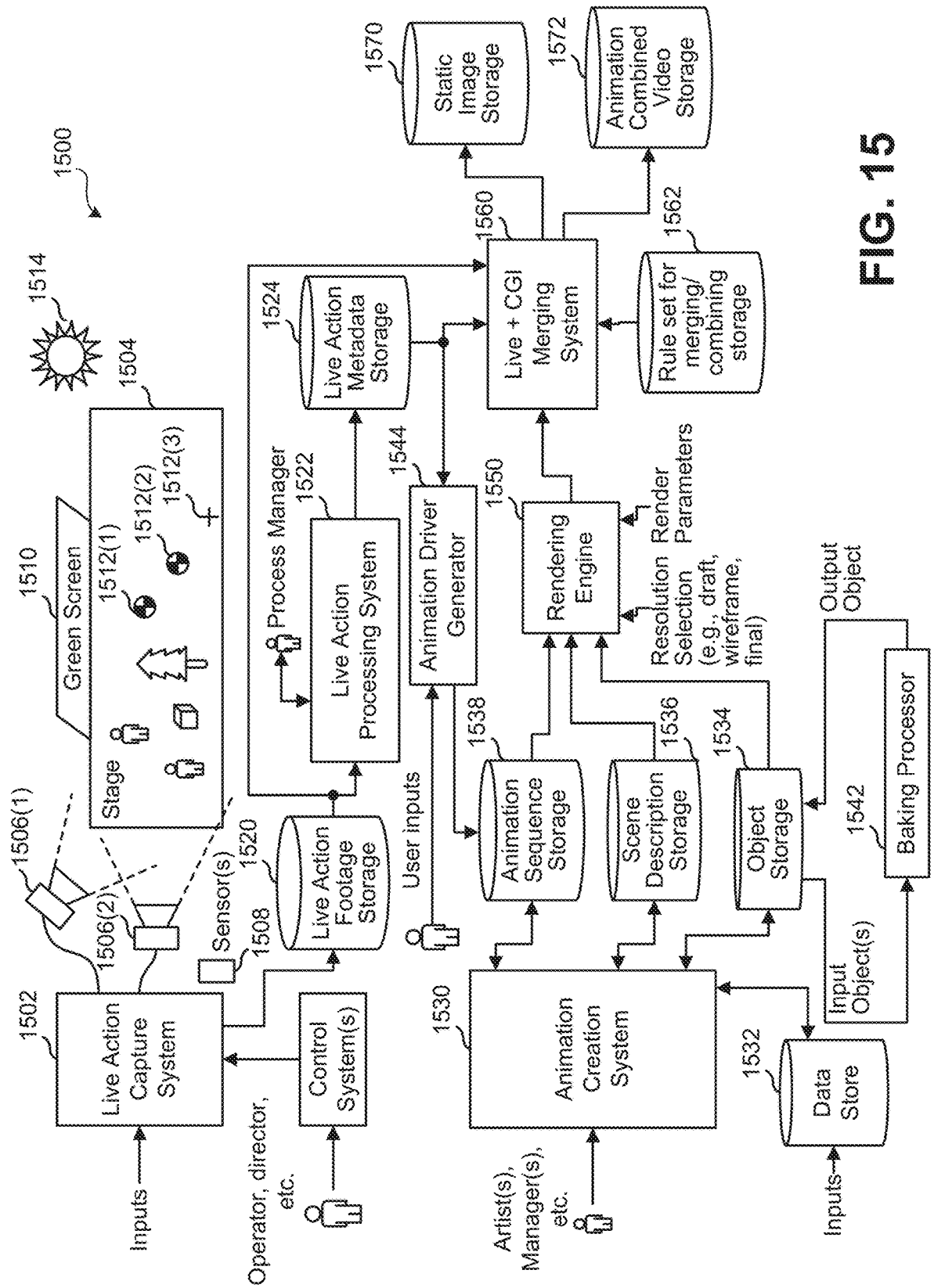
FIG. 15 illustrates an example visual content generation system as might be used to generate imagery in the form of still images and/or video sequences of images, according to various embodiments.

For example, FIG. 15 illustrates the example visual content generation system 1500 as might be used to generate imagery in the form of still images and/or video sequences of images. Visual content generation system 1500 might generate imagery of live action scenes, computer generated scenes, or a combination thereof. In a practical system, users are provided with tools that allow them to specify, at high levels and low levels where necessary, what is to go into that imagery. For example, a user might be an animator, artist, or other user (like animator/artist/user 408 illustrated in FIG. 4) and might use visual content generation system 1500 to capture interaction between two human actors performing live on a sound stage and replace one of the human actors with a computer-generated anthropomorphic non-human being that behaves in ways that mimic the replaced human actor's movements and mannerisms, and then add in a third computer-generated character and background scene elements that are computer-generated, all in order to tell a desired story or generate desired imagery.

Still images that are output by visual content generation system 1500 might be represented in computer memory as pixel arrays, such as a two-dimensional array of pixel color values, each associated with a pixel having a position in a two-dimensional image array. Pixel color values might be represented by three or more (or fewer) color values per pixel, such as a red value, a green value, and a blue value (e.g., in RGB format). Dimensions of such a two-dimensional array of pixel color values might correspond to a preferred and/or standard display scheme, such as 1920-pixel columns by 1280-pixel rows or 4096-pixel columns by 2160-pixel rows, or some other resolution. Images might or might not be stored in a compressed format, but either way, a desired image may be represented as a two-dimensional array of pixel color values. In another variation, images are represented by a pair of stereo images for three-dimensional presentations and in other variations, an image output, or a portion thereof, might represent three-dimensional imagery instead of just two-dimensional views. In yet other embodiments, pixel values are data structures and a pixel value is associated with a pixel and can be a scalar value, a vector, or another data structure associated with a corresponding pixel. That pixel value might include color values, or not, and might include depth values, alpha values, weight values, object identifiers or other pixel value components.

A stored video sequence might include a plurality of images such as the still images described above, but where each image of the plurality of images has a place in a timing sequence and the stored video sequence is arranged so that when each image is displayed in order, at a time indicated by the timing sequence, the display presents what appears to be moving and/or changing imagery. In one representation, each image of the plurality of images is a video frame having a specified frame number that corresponds to an amount of time that would elapse from when a video sequence begins playing until that specified frame is displayed. A frame rate might be used to describe how many frames of the stored video sequence are displayed per unit time. Example video sequences might include 24 frames per second (24 FPS), 50 FPS, 140 FPS, or other frame rates. In some embodiments, frames are interlaced or otherwise presented for display, but for clarity of description, in some examples, it is assumed that a video frame has one specified display time, but other variations might be contemplated.

One method of creating a video sequence is to simply use a video camera to record a live action scene, i.e., events that physically occur and can be recorded by a video camera. The events being recorded can be events to be interpreted as viewed (such as seeing two human actors talk to each other) and/or can include events to be interpreted differently due to clever camera operations (such as moving actors about a stage to make one appear larger than the other despite the actors actually being of similar build, or using miniature objects with other miniature objects so as to be interpreted as a scene containing life-sized objects).

Creating video sequences for story-telling or other purposes often calls for scenes that cannot be created with live actors, such as a talking tree, an anthropomorphic object, space battles, and the like. Such video sequences might be generated computationally rather than capturing light from live scenes. In some instances, an entirety of a video sequence might be generated computationally, as in the case of a computer-animated feature film. In some video sequences, it is desirable to have some computer-generated imagery and some live action, perhaps with some careful merging of the two.

While computer-generated imagery might be creatable by manually specifying each color value for each pixel in each frame, this is likely too tedious to be practical. As a result, a creator uses various tools to specify the imagery at a higher level. As an example, an artist (e.g., animator/artist/user 408 illustrated in FIG. 4) might specify the positions in a scene space, such as a three-dimensional coordinate system, of objects and/or lighting, as well as a camera viewpoint, and a camera view plane. From that, a rendering engine could take all of those as inputs, and compute each of the pixel color values in each of the frames. In another example, an artist specifies position and movement of an articulated object having some specified texture rather than specifying the color of each pixel representing that articulated object in each frame.

In a specific example, a rendering engine performs ray tracing wherein a pixel color value is determined by computing which objects lie along a ray traced in the scene space from the camera viewpoint through a point or portion of the camera view plane that corresponds to that pixel. For example, a camera view plane might be represented as a rectangle having a position in the scene space that is divided into a grid corresponding to the pixels of the ultimate image to be generated, and if a ray defined by the camera viewpoint in the scene space and a given pixel in that grid first intersects a solid, opaque, blue object, that given pixel is assigned the color blue. Of course, for modern computer-generated imagery, determining pixel colors—and thereby generating imagery—can be more complicated, as there are lighting issues, reflections, interpolations, and other considerations.

As illustrated in FIG. 15, a live action capture system 1502 captures a live scene that plays out on a stage 1504. Live action capture system 1502 is described herein in greater detail, but might include computer processing capabilities, image processing capabilities, one or more processors, program code storage for storing program instructions executable by the one or more processors, as well as user input devices and user output devices, not all of which are shown.

In a specific live action capture system, cameras 1506(1) and 1506(2) capture the scene, while in some systems, there might be other sensor(s) 1508 that capture information from the live scene (e.g., infrared cameras, infrared sensors, motion capture ("mo-cap") detectors, etc.). On stage 1504, there might be human actors, animal actors, inanimate objects, background objects, and possibly an object such as a green screen 1510 that is designed to be captured in a live scene recording in such a way that it is easily overlaid with computer-generated imagery. Stage 1504 might also contain objects that serve as fiducials, such as fiducials 1512(1)-(3), that might be used post-capture to determine where an object was during capture. A live action scene might be illuminated by one or more lights, such as an overhead light 1514.

During or following the capture of a live action scene, live action capture system 1502 might output live action footage to a live action footage storage 1520. A live action processing system 1522 might process live action footage to generate data about that live action footage and store that data into a live action metadata storage 1524. Live action processing system 1522 might include computer processing capabilities, image processing capabilities, one or more processors, program code storage for storing program instructions executable by the one or more processors, as well as user input devices and user output devices, not all of which are shown. Live action processing system 1522 might process live action footage to determine boundaries of objects in a frame or multiple frames, determine locations of objects in a live action scene, where a camera was relative to some action, distances between moving objects and fiducials, etc. Where elements have sensors attached to them or are detected, the metadata might include location, color, and intensity of overhead light 1514, as that might be useful in post-processing to match computer-generated lighting on objects that are computer-generated and overlaid on the live action footage. Live action processing system 1522 might operate autonomously, perhaps based on predetermined program instructions, to generate and output the live action metadata upon receiving and inputting the live action footage. The live action footage can be camera-captured data as well as data from other sensors.

An animation creation system 1530 is another part of visual content generation system 1500. Animation creation system 1530 might include computer processing capabilities, image processing capabilities, one or more processors, program code storage for storing program instructions executable by the one or more processors, as well as user input devices and user output devices, not all of which are shown. Animation creation system 1530 might be used by animation artists, managers, and others to specify details, perhaps programmatically and/or interactively, of imagery to be generated. From user input and data from a database or other data source, indicated as a data store 1532, animation creation system 1530 might generate and output data representing objects (e.g., a horse, a human, a ball, a teapot, a cloud, a light source, a texture, etc.) to an object storage 1534, generate and output data representing a scene into a scene description storage 1536, and/or generate and output data representing animation sequences to an animation sequence storage 1538.

Scene data might indicate locations of objects and other visual elements, values of their parameters, lighting, camera location, camera view plane, and other details that a rendering engine 1550 might use to render CGI imagery. For example, scene data might include the locations of several articulated characters, background objects, lighting, etc. specified in a two-dimensional space, three-dimensional space, or other dimensional space (such as a 2.5-dimensional space, three-quarter dimensions, pseudo-3D spaces, etc.) along with locations of a camera viewpoint and view place from which to render imagery. For example, scene data might indicate that there is to be a red, fuzzy, talking dog in the right half of a video and a stationary tree in the left half of the video, all illuminated by a bright point light source that is above and behind the camera viewpoint. In some cases, the camera viewpoint is not explicit, but can be determined from a viewing frustum. In the case of imagery that is to be rendered to a rectangular view, the frustum would be a truncated pyramid. Other shapes for a rendered view are possible and the camera view plane could be different for different shapes.

Animation creation system 1530 might be interactive, allowing a user to read in animation sequences, scene descriptions, object details, etc. and edit those, possibly returning them to storage to update or replace existing data. As an example, an operator might read in objects from object storage into a baking processor 1542 that would transform those objects into simpler forms and return those to object storage 1534 as new or different objects. For example, an operator might read in an object that has dozens of specified parameters (movable joints, color options, textures, etc.), select some values for those parameters and then save a baked object that is a simplified object with now fixed values for those parameters.

Rather than requiring user specification of each detail of a scene, data from data store 1532 might be used to drive object presentation. For example, if an artist is creating an animation of a spaceship passing over the surface of the Earth, instead of manually drawing or specifying a coastline, the artist might specify that animation creation system 1530 is to read data from data store 1532 in a file containing coordinates of Earth coastlines and generate background elements of a scene using that coastline data.

Animation sequence data might be in the form of time series of data for control points of an object that has attributes that are controllable. For example, an object might be a humanoid character with limbs and joints that are movable in manners similar to typical human movements. An artist can specify an animation sequence at a high level, such as "the left hand moves from location (X1, Y1, Z1) to (X2, Y2, Z2) over time T1 to T2", at a lower level (e.g., "move the elbow joint 2.5 degrees per frame") or even at a very high level (e.g., "character A should move, consistent with the laws of physics that are given for this scene, from point P1 to point P2 along a specified path").

Animation sequences in an animated scene might be specified by what happens in a live action scene. An animation driver generator 1544 might read in live action metadata, such as data representing movements and positions of body parts of a live actor during a live action scene. Animation driver generator 1544 might generate corresponding animation parameters to be stored in animation sequence storage 1538 for use in animating a CGI object. This can be useful where a live action scene of a human actor is captured while wearing mo-cap fiducials (e.g., high-contrast markers outside actor clothing, high-visibility paint on actor skin, face, etc.) and the movement of those fiducials is determined by live action processing system 1522. Animation driver generator 1544 might convert that movement data into specifications of how joints of an articulated CGI character are to move over time.

A rendering engine 1550 can read in animation sequences, scene descriptions, and object details, as well as rendering engine control inputs, such as a resolution selection and a set of rendering parameters. Resolution selection might be useful for an operator to control a trade-off between speed of rendering and clarity of detail, as speed might be more important than clarity for a movie maker to test some interaction or direction, while clarity might be more important than speed for a movie maker to generate data that will be used for final prints of feature films to be distributed. Rendering engine 1550 might include computer processing capabilities, image processing capabilities, one or more processors, program code storage for storing program instructions executable by the one or more processors, as well as user input devices and user output devices, not all of which are shown.

Visual content generation system 1500 can also include a merging system 1560 that merges live footage with animated content. The live footage might be obtained and input by reading from live action footage storage 1520 to obtain live action footage, by reading from live action metadata storage 1524 to obtain details such as presumed segmentation in captured images segmenting objects in a live action scene from their background (perhaps aided by the fact that green screen 1510 was part of the live action scene), and by obtaining CGI imagery from rendering engine 1550.

A merging system 1560 might also read data from rulesets for merging/combining storage 1562. A very simple example of a rule in a ruleset might be "obtain a full image including a two-dimensional pixel array from live footage, obtain a full image including a two-dimensional pixel array from rendering engine 1550, and output an image where each pixel is a corresponding pixel from rendering engine 1550 when the corresponding pixel in the live footage is a specific color of green, otherwise output a pixel value from the corresponding pixel in the live footage."

Merging system 1560 might include computer processing capabilities, image processing capabilities, one or more processors, program code storage for storing program instructions executable by the one or more processors, as well as user input devices and user output devices, not all of which are shown. Merging system 1560 might operate autonomously, following programming instructions, or might have a user interface or programmatic interface over which an operator can control a merging process. In some embodiments, an operator can specify parameter values to use in a merging process and/or might specify specific tweaks to be made to an output of merging system 1560, such as modifying boundaries of segmented objects, inserting blurs to smooth out imperfections, or adding other effects. Based on its inputs, merging system 1560 can output an image to be stored in a static image storage 1570 and/or a sequence of images in the form of video to be stored in an animated/combined video storage 1572.

Thus, as described, visual content generation system 1500 can be used to generate video that combines live action with computer-generated animation using various components and tools, some of which are described in more detail herein. While visual content generation system 1500 might be useful for such combinations, with suitable settings, it can be used for outputting entirely live action footage or entirely CGI sequences. The code may also be provided and/or carried by a transitory computer readable medium, e.g., a transmission medium such as in the form of a signal transmitted over a network.

According to one embodiment, the techniques described herein are implemented by one or more generalized computing systems programmed to perform the techniques pursuant to program instructions in firmware, memory, other storage, or a combination. Special-purpose computing devices may be used, such as desktop computer systems, portable computer systems, handheld devices, networking devices or any other device that incorporates hard-wired and/or program logic to implement the techniques.

One embodiment might include a carrier medium carrying image data that includes image data having shadow details generated using the methods described herein. The carrier medium can comprise any medium suitable for carrying the image data, including a storage medium, e.g., solid-state memory, an optical disk or a magnetic disk, or a transient medium, e.g., a signal carrying the image data such as a signal transmitted over a network, a digital signal, a radio frequency signal, an acoustic signal, an optical signal or an electrical signal.

Figure 16:
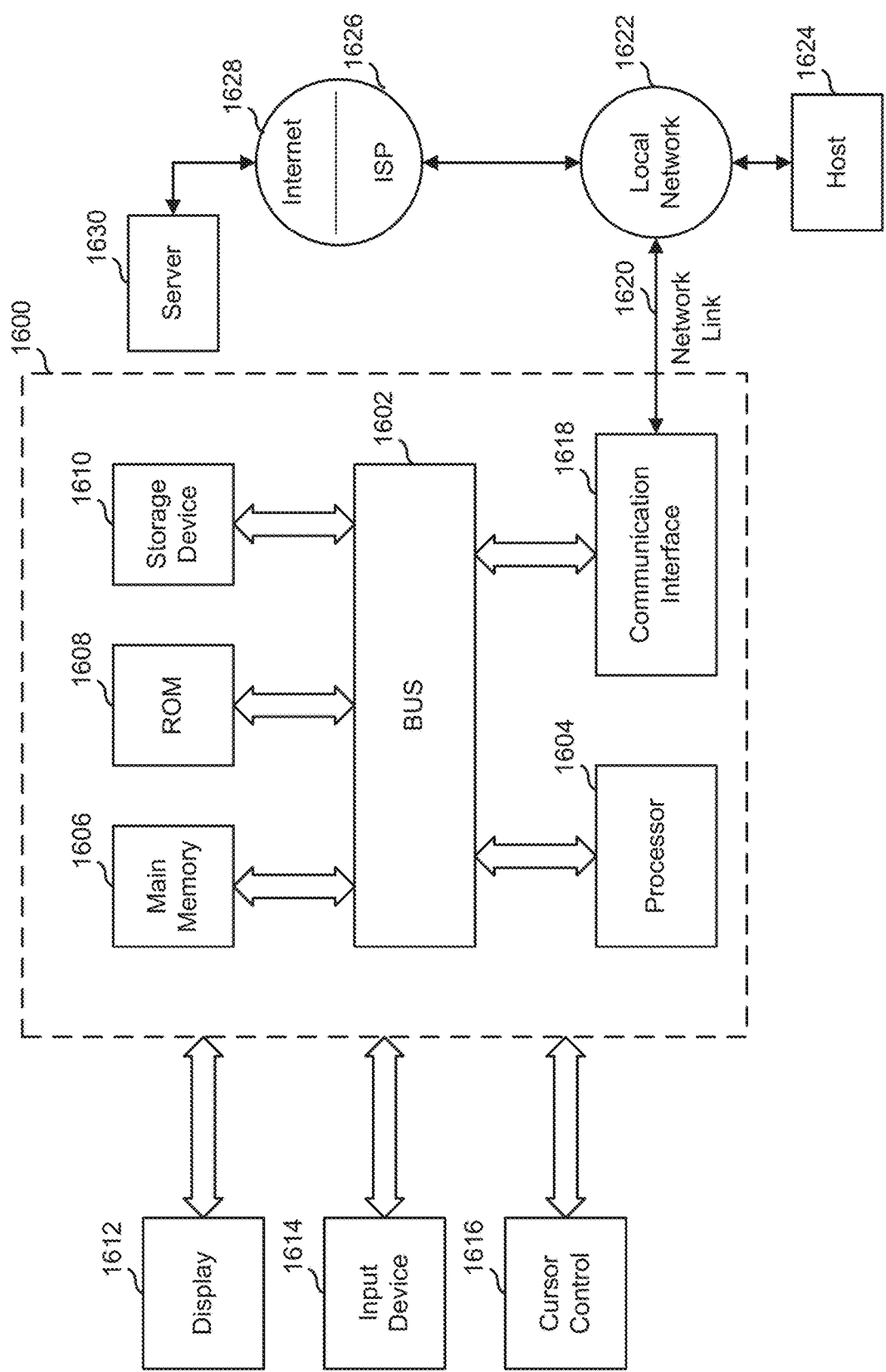
FIG. 16 is a block diagram illustrating an example computer system upon which computer systems of the systems illustrated in FIGS. 1 and 15 may be implemented.

For example, FIG. 16 is a block diagram that illustrates a computer system 1600 upon which the computer systems of the systems described herein and/or visual content generation system 1500 (see FIG. 15) may be implemented. Computer system 1600 includes a bus 1602 or other communication mechanism for communicating information, and a processor 1604 coupled with bus 1602 for processing information. Processor 1604 may be, for example, a general-purpose microprocessor.

Computer system 1600 also includes a main memory 1606, such as a random-access memory (RAM) or other dynamic storage device, coupled to bus 1602 for storing information and instructions to be executed by processor 1604. Main memory 1606 may also be used for storing temporary variables or other intermediate information during execution of instructions to be executed by processor 1604. Such instructions, when stored in non-transitory storage media accessible to processor 1604, render computer system 1600 into a special-purpose machine that is customized to perform the operations specified in the instructions.

Computer system 1600 further includes a read only memory (ROM) 1608 or other static storage device coupled to bus 1602 for storing static information and instructions for processor 1604. A storage device 1610, such as a magnetic disk or optical disk, is provided and coupled to bus 1602 for storing information and instructions.

Computer system 1600 may be coupled via bus 1602 to a display 1612, such as a computer monitor, for displaying information to a computer user. An input device 1614, including alphanumeric and other keys, is coupled to bus 1602 for communicating information and command selections to processor 1604. Another type of user input device is a cursor control 1616, such as a mouse, a trackball, or cursor direction keys for communicating direction information and command selections to processor 1604 and for controlling cursor movement on display 1612. This input device typically has two degrees of freedom in two axes, a first axis (e.g., x) and a second axis (e.g., y), that allows the device to specify positions in a plane.

Computer system 1600 may implement the techniques described herein using customized hard-wired logic, one or more ASICs or FPGAs, firmware and/or program logic which in combination with the computer system causes or programs computer system 1600 to be a special-purpose machine. According to one embodiment, the techniques herein are performed by computer system 1600 in response to processor 1604 executing one or more sequences of one or more instructions contained in main memory 1606. Such instructions may be read into main memory 1606 from another storage medium, such as storage device 1610. Execution of the sequences of instructions contained in main memory 1606 causes processor 1604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may include non-volatile media and/or volatile media. Non-volatile media includes, for example, optical or magnetic disks, such as storage device 1610. Volatile media includes dynamic memory, such as main memory 1606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire, and fiber optics, including the wires that include bus 1602. Transmission media can also take the form of acoustic or light waves, such as those generated during radio-wave and infra-red data communications.

Various forms of media may be involved in carrying one or more sequences of one or more instructions to processor 1604 for execution. For example, the instructions may initially be carried on a magnetic disk or solid-state drive of a remote computer. The remote computer can load the instructions into its dynamic memory and send the instructions over a network connection. A modem or network interface local to computer system 1600 can receive the data. Bus 1602 carries the data to main memory 1606, from which processor 1604 retrieves and executes the instructions. The instructions received by main memory 1606 may optionally be stored on storage device 1610 either before or after execution by processor 1604.

Computer system 1600 also includes a communication interface 1618 coupled to bus 1602. Communication interface 1618 provides a two-way data communication coupling to a network link 1620 that is connected to a local network 1622. For example, communication interface 1618 may be a network card, a modem, a cable modem, or a satellite modem to provide a data communication connection to a corresponding type of telephone line or communications line. Wireless links may also be implemented. In any such implementation, communication interface 1618 sends and receives electrical, electromagnetic, or optical signals that carry digital data streams representing various types of information.

Network link 1620 typically provides data communication through one or more networks to other data devices. For example, network link 1620 may provide a connection through local network 1622 to a host computer 1624 or to data equipment operated by an Internet Service Provider (ISP) 1626. ISP 1626 in turn provides data communication services through the world-wide packet data communication network now commonly referred to as the "Internet" 1628. Local network 1622 and Internet 1628 both use electrical, electromagnetic, or optical signals that carry digital data streams. The signals through the various networks and the signals on network link 1620 and through communication interface 1618, which carry the digital data to and from computer system 1600, are example forms of transmission media.

Computer system 1600 can send messages and receive data, including program code, through the network(s), network link 1620, and communication interface 1618. In the Internet example, a server 1630 might transmit a requested code for an application program through the Internet 1628, ISP 1626, local network 1622, and communication interface 1618. The received code may be executed by processor 1604 as it is received, and/or stored in storage device 1610, or other non-volatile storage for later execution.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. The code may also be provided carried by a transitory computer readable medium e.g., a transmission medium such as in the form of a signal transmitted over a network.

The following numbered examples are embodiments:

1. A computer-implemented method for processing data derived from scans of live actors, the method comprising:
under the control of one or more computer systems configured with executable instructions:
obtaining pose data corresponding to a pose of an object in a first pose, wherein the object corresponds to a part of an actor and the pose data corresponds to a scan of the part of the actor;
determining a set of feature values for positions or characteristics of features of the object;
generating a first two-dimensional mapping of the set of feature values from the pose data to a high-resolution two-dimensional map;
generating a second two-dimensional mapping from the first two-dimensional mapping at a lower resolution than the first two-dimensional mapping;
generating, from the second two-dimensional mapping, an object rig having a first object rig state corresponding to the first pose for the object;
obtaining artist modifications, in an object rig space, to the object rig to form a second object rig state;
generating a third two-dimensional mapping representing the artist modifications to the object rig;
applying the third two-dimensional mapping to a neural network trained on differing resolution levels of a set of two-dimensional maps, to form a fourth two-dimensional mapping having a higher resolution than the third two-dimensional mapping; and
generating a mesh, defined in a three-dimensional space, corresponding to the pose data modified according to the artist modifications made in the object rig space.

2. The computer-implemented method of example 1, wherein the pose data comprises scan data corresponding to the scan of the part of the actor in the first pose.

3. The computer-implemented method of example 1 or example 2, wherein the object rig comprises a facial rig, the first object rig state represents a neutral pose for the facial rig, and the second object rig state represents a second pose for the facial rig distinct from the neutral pose.

4. The computer-implemented method of any one of examples 1 to 3, wherein the object comprises a face of the actor, and wherein the pose data comprises a facial scan, wherein the object rig is a facial rig.

5. The computer-implemented method of example 4, further comprising obtaining scan data from a plurality of poses of actors and generating a plurality of facial rig states from the plurality of poses.

6. The computer-implemented method of any one of examples 1 to 5, wherein the set of feature values comprises positions of a plurality of vertices of the pose data.

7. The computer-implemented method of any one of examples 1 to 6, wherein the neural network is a convolutional neural network (CNN), the method further comprising training the CNN by:
obtaining a plurality of scan datasets, one scan dataset of which comprises the scan of the part of the actor;
generating a plurality of low-resolution images, wherein each of the plurality of low-resolution images comprises an image of a scan represented in the plurality of scan datasets;
obtaining a two-dimensional map of a face of the actor;
generating a plurality of vertex maps, wherein each of the plurality of vertex maps comprises represents a mapping from a low-resolution image of the plurality of vertex maps to the two-dimensional map; and
applying, in a training process, pairs of CNN inputs, wherein a pair of CNN inputs comprises a vertex map from the plurality of vertex maps and a ground truth input comprising a corresponding scan of the plurality of scan datasets wherein the vertex map is derived from the corresponding scan, whereby the CNN is trained to output an estimate of a scan based on an input vertex map.

8. The computer-implemented method of example 7, wherein the input vertex map corresponds to vertices in a two-dimensional space that map to vertices in the corresponding scan.

9. The computer-implemented method of any one of examples 1 to 8, wherein a vector represents a movement of a point on a facial scan in a two-dimensional space.

10. The computer-implemented method of any one of examples 1 to 9, wherein two-dimensional mappings arrays are stored as UV maps in image files.

11. The computer-implemented method of any one of examples 1 to 10, further comprising generating a facial model from a facial scan as the pose data, to be used in generating a facial expression procedurally and independent of scans of the actor.

12. A non-transitory computer-readable storage medium storing instructions, which when executed by at least one processor of a computer system, causes the computer system to carry out the method of any one of examples 1 to 11.

13. A computer system comprising:
one or more processors; and
a storage medium storing instructions, which when executed by the one or more processors, cause the computer system to implement the method of any one of examples 1 to 11.

14. A carrier medium carrying image data that includes pixel information generated according to the method of any one of examples 1 to 11.

Although the embodiments are described with reference to a face of an actor, the method can be performed based on other body parts of an actor.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

The use of examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Further embodiments can be envisioned to one of ordinary skill in the art after reading this disclosure. In other embodiments, combinations or sub-combinations of the above-disclosed invention can be advantageously made. The example arrangements of components are shown for purposes of illustration and combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method for processing data derived from scans of live actors, the method comprising:
    obtaining pose data corresponding to a pose of an object in a first pose, wherein the object corresponds to a part of an actor and the pose data corresponds to a scan of the part of the actor;
    determining a set of feature values for positions or characteristics of features of the object;
    generating a first two-dimensional mapping of the set of feature values from the pose data to a high-resolution two-dimensional map;
    generating a second two-dimensional mapping from the first two-dimensional mapping at a lower resolution than the first two-dimensional mapping;
    generating, from the second two-dimensional mapping, an object rig having a first object rig state corresponding to the first pose for the object;
    obtaining artist modifications, in an object rig space, to the object rig to form a second object rig state;
    generating a third two-dimensional mapping representing the artist modifications to the object rig;
    applying the third two-dimensional mapping to a neural network trained on differing resolution levels of a set of two-dimensional maps, to form a fourth two-dimensional mapping having a higher resolution than the third two-dimensional mapping; and
    generating a mesh, defined in a three-dimensional space, corresponding to the pose data modified according to the artist modifications made in the object rig space, wherein the three-dimensional space in which the mesh is defined is a space distinct from the object rig space.

2. The computer-implemented method of claim 1, wherein the pose data comprises scan data corresponding to the scan of the part of the actor in the first pose.

3. The computer-implemented method of claim 1, wherein the object rig comprises a facial rig, the first object rig state represents a neutral pose for the facial rig, and the second object rig state represents a second pose for the facial rig distinct from the neutral pose.

4. The computer-implemented method of claim 1, wherein the object comprises a face of the actor, and wherein the pose data comprises a facial scan, wherein the object rig is a facial rig.

5. The computer-implemented method of claim 4, further comprising obtaining scan data from a plurality of poses of the actor and generating a plurality of facial rig states from the plurality of poses.

6. The computer-implemented method of claim 1, wherein the set of feature values comprises positions of a plurality of vertices of the pose data.

7. The computer-implemented method of claim 1, wherein the neural network is a convolutional neural network (CNN), the method further comprising training the CNN by:
    obtaining a plurality of scan datasets, one scan dataset of which comprises the scan of the part of the actor;
    generating a plurality of low-resolution images, wherein each of the plurality of low-resolution images comprises an image of a scan represented in the plurality of scan datasets;
    obtaining a two-dimensional map of a face of the actor;

generating a plurality of vertex maps, wherein each of the plurality of vertex maps comprises represents a mapping from a low-resolution image of the plurality of vertex maps to the two-dimensional map; and applying, in a training process, pairs of CNN inputs, wherein a pair of CNN inputs comprises a vertex map from the plurality of vertex maps and a ground truth input comprising a corresponding scan of the plurality of scan datasets wherein the vertex map is derived from the corresponding scan, whereby the CNN is trained to output an estimate of a scan based on an input vertex map.

8. The computer-implemented method of claim 7, wherein the input vertex map corresponds to vertices in a two-dimensional space that map to vertices in the corresponding scan.

9. The computer-implemented method of claim 1, wherein a vector represents a movement of a point on a facial scan in a two-dimensional space.

10. The computer-implemented method of claim 1, wherein two-dimensional mappings arrays are stored as UV maps in image files.

11. The computer-implemented method of claim 1, further comprising generating a facial model from a facial scan as the pose data, to be used in generating a facial expression procedurally and independent of scans of the actor.

12. A non-transitory computer-readable storage medium storing instructions, which when executed by at least one processor of a computer system, causes the computer system to carry out the method of claim 1.

13. A computer system comprising:
one or more processors; and
a storage medium storing instructions, which when executed by the one or more processors, cause the computer system to implement the method of claim 1.

14. A non-transitory carrier medium carrying image data that includes pixel information generated according to the method of claim 1.

* * * * *